United States Patent [19]
Feldstein

[11] Patent Number: 5,523,667
[45] Date of Patent: Jun. 4, 1996

[54] ALKALINE BATTERY CHARGER AND METHOD OF OPERATING SAME

[76] Inventor: Robert S. Feldstein, 4 Clinton Ave., Dobbs Ferry, N.Y. 10522

[21] Appl. No.: 202,832

[22] Filed: Feb. 28, 1994

Related U.S. Application Data

[63] Continuation-in-part of Ser. No. 27,386, Mar. 8, 1993, which is a continuation-in-part of Ser. No. 950,066, Sep. 23, 1992, Pat. No. 5,291,116, which is a continuation-in-part of Ser. No. 826,002, Jan. 27, 1992, Pat. No. 5,304,914.

[51] Int. Cl.⁶ .............................. H02J 7/00; H01M 10/44
[52] U.S. Cl. .................................... 320/3; 320/18; 320/39
[58] Field of Search ................................ 320/5, 6, 9, 14, 320/15, 18, 19, 21, 22, 39, 31, 37, 3

[56] References Cited

U.S. PATENT DOCUMENTS

| | | | |
|---|---|---|---|
| 3,614,583 | 10/1971 | Burkett et al. | 320/5 |
| 3,623,139 | 11/1971 | Dickerson | 320/22 |
| 3,917,990 | 11/1975 | Sherman, Jr. | 320/22 X |
| 4,061,955 | 12/1977 | Thomas et al. | 320/6 |
| 4,238,721 | 12/1980 | DeLuca et al. | 320/22 X |
| 4,385,269 | 5/1983 | Aspinwall et al. | 320/14 |
| 4,614,905 | 9/1986 | Petersson et al. | 320/18 |
| 4,616,170 | 10/1986 | Urstoger | 320/5 |
| 4,740,739 | 4/1988 | Quammen et al. | 320/14 |
| 4,829,225 | 5/1989 | Podrazhansky et al. | 320/14 |
| 5,003,244 | 3/1991 | Davis, Jr. | 320/17 |

FOREIGN PATENT DOCUMENTS

| | | |
|---|---|---|
| WO7901061 | 12/1979 | WIPO. |
| WO8101488 | 5/1981 | WIPO. |

OTHER PUBLICATIONS

C. L. Mantell, "Batteries And Energy System," pp. 33–77, McGraw-Hill Book Company, 1970.

Primary Examiner—Peter S. Wong
Assistant Examiner—Edward Tso
Attorney, Agent, or Firm—Howard M. Cohn

[57] ABSTRACT

Apparatus and methods for recharging various types of battery cells are enclosed involving alternating periods of charging and discharging of the cells, a reference charge cut-off voltage, a comparator for comparing cell voltage with cut-off voltage, and a circuit for stopping charging activity when cell open circuit voltage is at least a desired minimum voltage. Charge activity is terminated following the achievement of a minimum acceptable state-of-charge so as to limit the total current delivered to the cell in order to prevent cell degradation.

12 Claims, 10 Drawing Sheets

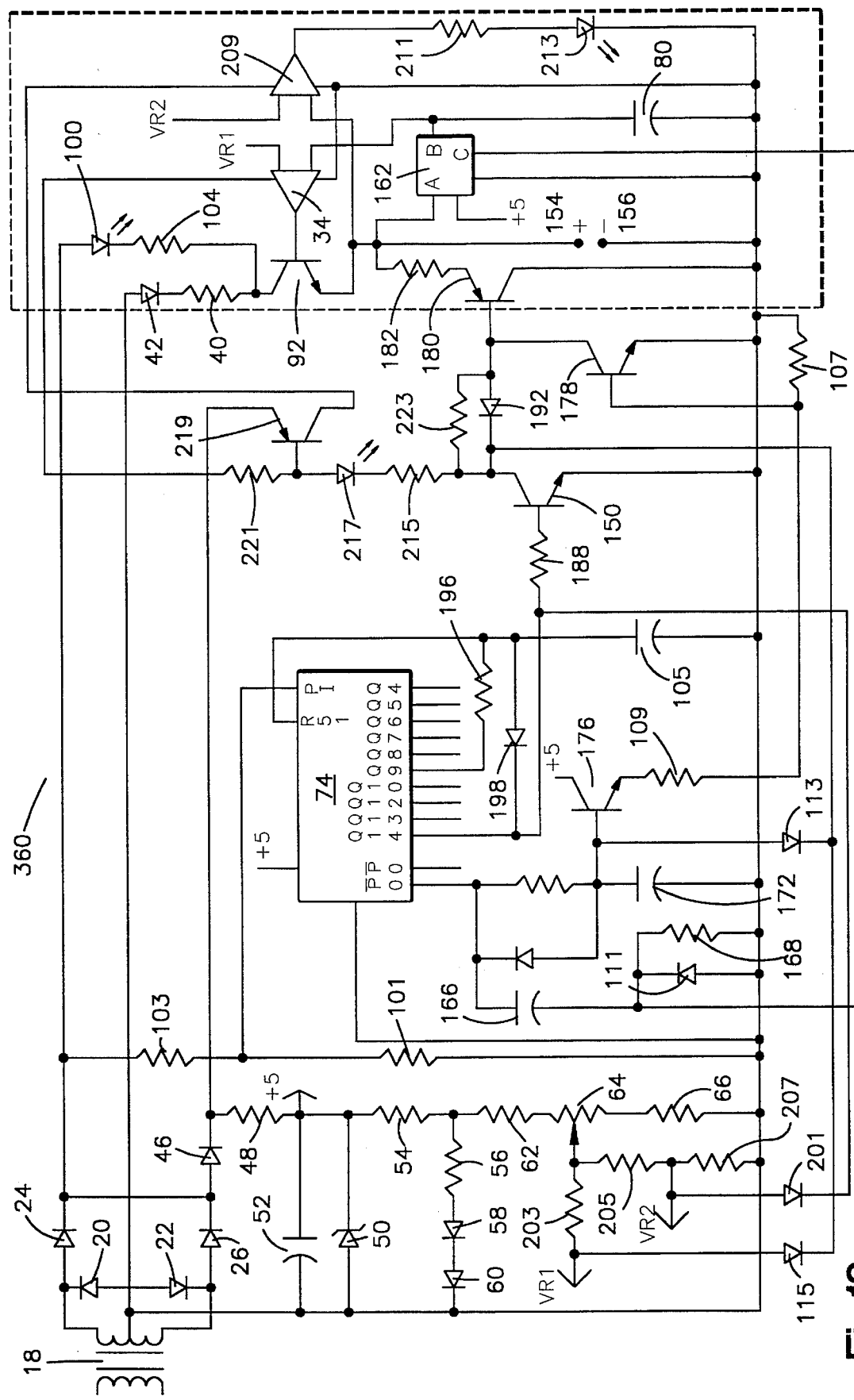

ALKALINE BATTERY CHARGER AND METHOD OF OPERATING SAME

CROSS-REFERENCE TO RELATED PATENT APPLICATIONS

This application is a continuation-in-part of applicant's patent application U.S. Ser. No. 08/027,386, filed Mar. 8, 1993, which in turn is a continuation-in-part of U.S. Ser. No. 950,066, filed Sep. 23, 1992, now U.S. Pat. No. 5,291,116 which in turn is a continuation-in-part of U.S. Ser. No. 07/826,002, filed on Jan. 27, 1992 now U.S. Pat. No. 56,304,914.

FIELD OF THE INVENTION

This invention relates to the field of battery charging conventional primary alkaline batteries. More particularly, the invention relates to a battery charger and method of operating suitable for recharging primary zinc-manganese dioxide ($ZnMnO_2$) alkaline cells as well as rechargeable alkaline manganese cells, nickel cadmium cells, and conventional standard and heavy duty "dry cells" to the extent that they are rechargeable.

BACKGROUND OF THE INVENTION

While recharging of primary batteries is frequently discouraged by battery manufacturers, as discussed in detail in each of Applicant's copending applications listed above, which are incorporated by reference in their entireties herein, under certain conditions, primary batteries can be recharged.

As disclosed in the listed Applicant's copending applications, novel battery chargers have been developed by applicant which are capable of recharging primary zinc-manganese dioxide alkaline cells, rechargeable alkaline manganese (R.A.M.) cells, nickel cadmium cells, and to the extent that they are rechargeable, conventional standard and heavy duty "dry cells". The critical parameters relating to the charging of each type of cell or battery are charging current, cut-off voltage, temperature coefficient of cut-off voltage, and short and long reverse pulse patterns, i.e., their duration, repetition rate and current.

While the battery chargers described in Applicant's copending applications have enabled successful recharging of primary zinc-manganese dioxide alkaline batteries, rechargeable alkaline manganese cells, nickel cadmium cells, and conventional standard and heavy duty "dry cells", there has been a problem caused by the rising internal impedance of certain primary alkaline cells as a function of increasing state-of-charge. While there are many possible theories to explain this effect, and its variability from cell to cell, and from charge cycle to charge cycle, the fact is that on the average, the internal impedance does rise as the state of charge rises above from about a third of available capacity. It has also been observed that fixed voltage float and/or alternating current (A.C.) components including those from an A.C. charge current component or from charge/discharge activity, do tend to progressively raise internal impedance, even when the cell is near available capacity and no significant net charging is occurring.

The problem of rising internal impedance as a function of increasing state-of-charge is particularly acute when recharging primary $ZnMnO_2$ alkaline batteries which are constructed of essentially non-recombinant cells. Therefore, if charge storage efficiency (the fraction of the charging current which is stored and available for discharge) declines with rising state of charge (as it does for all cells), then a rising fraction of the incoming current produces non-equilibrium reactions which are not indefinitely sustainable and which lead to cell evolution, generally in an undesirable direction.

OBJECTS AND SUMMARY OF THE INVENTION

It is an object of the present invention to provide a battery charger and method of operating the charger for recharging primary $ZnMnO_2$ alkaline batteries to obviate the problems and limitations of the prior art systems.

It is a further object of the present invention to provide a battery charger and method of operating the charger for recharging primary $ZnMnO_2$ alkaline batteries which terminates all charge and discharge activity as soon as possible following the achievement of a minimum acceptable state-of-charge so as to limit the total current delivered to the cell to the lowest possible value.

It is still a further object of the present invention to provide a battery charger and method of operating the charger which is optimized for recharging primary $ZnMnO_2$ alkaline batteries while maintaining its ability to recharge rechargeable alkaline manganese cells, nickel cadmium cells, and to the extent that they are rechargeable, conventional dry cells.

According to the invention, superior cell performance, for many applications, can only be achieved by a trade off between less than maximum available capacity (as defined by low discharge rate current times time) and lower internal impedance (and therefore superior ability to support a moderate current load). The trade-off is optimized by the selection and implementation of a system which terminates all charge and discharge activity (as soon as possible) following the achievement of a minimum acceptable state-of-charge, to limit the total current delivered to the cell to the lowest possible value. Therefore, an improvement in the overall quality of the recharged cell, i.e. the capacity and available power output of the cell considered together, can be provided by selecting a charge cut-off voltage which represents a value sufficiently above the cell open circuit voltage (over voltage) to insure adequate charge acceptance, but sufficiently low to avoid as much irreversible chemistry as possible (such as the well known permanganate threshold).

BRIEF DESCRIPTION OF THE DRAWINGS

The structure, operation, and advantages of the presently preferred embodiment of the invention will become further apparent upon consideration of the following description taken in conjunction with the accompanying drawings, wherein:

FIG. 1, are a schematic illustration of one embodiment of a battery charger which utilizes a dual pulse reverse current pattern, as previously disclosed by applicant in pending parent application Ser. No. 08/027,386 (386);

FIG. 10 is a schematic of still another battery charger disclosed in the '386 application;

DESCRIPTION OF THE PREFERRED EMBODIMENTS

Figure 1A:
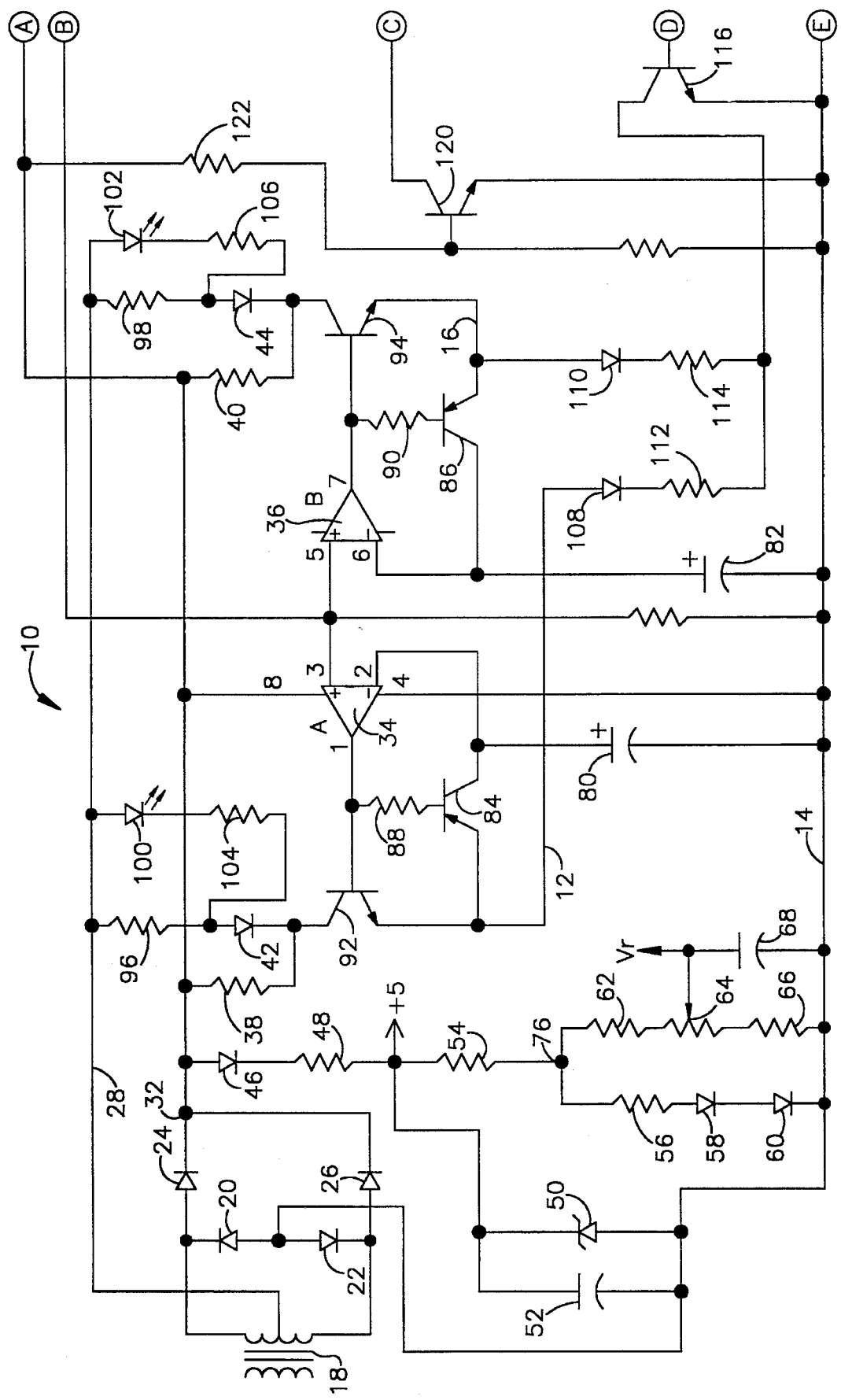
FIGS. 1-A and 1-B, which collectively comprise

In one illustrative preferred embodiment, the battery charger of this invention is used to charge primary zinc-manganese dioxide batteries. As is known to those skilled in the art, these primary zinc-manganese dioxide cells are usually considered to be non-rechargeable, being optimized to have their energy used and then to be discarded inasmuch as they are not protected from reaching chemically irreversible states.

These zinc-manganese dioxide primary cells are well known to those skilled in the art as "dry cells," "heavy duty dry cells," and "alkaline primary batteries;" and they are readily commercially available. Thus, by way of illustration and not limitation, and referring to Newark Electronics catalog number 110 (Newark Electronics, Chicago, Ill., 1989), one may purchase an Eveready EN91 alkaline battery (see page 562), an Eveready 101-5 zinc carbon battery (see page 562), an Eveready EV15 industrial general purpose zinc carbon battery (see page 562), an Eveready EV115 industrial heavy duty zinc carbon battery (page 562), a Duracell MN1500 alkaline battery (page 564), and the like.

By way of illustration, the dry cell may be a zinc-ammonium chloride-manganese dioxide carbon system; see, e.g., pages 34–54 of Charles Mantell's "Batteries & Energy Systems" (McGraw-Hill Inc., New York, 1983). Thus, e.g., the dry cell may be zinc-alkali-manganese dioxide primary battery (see pages 55–67 of the Mantell book), or a heavy-duty "dry cell" (see page 70 of the Mantell book), and the like.

In one preferred embodiment, the battery used in applicant's process preferably is an alkaline-manganese dioxide primary cell. By way of illustration, one such battery is disclosed in U.S. Pat. No. 4,857,424, the disclosure of which is hereby incorporated by reference in its entirety into this specification. In the remainder of this specification, reference will be made to the use of the process with such battery it being understood that the process also is applicable to other zinc carbon cells.

The charger of applicant's invention can recharge a battery which has been discharged to either a minor extent, or a major extent; and, furthermore, it is also capable of recharging a battery which was not placed on charge promptly following removal from service (which is often referred to as "sleepy battery" or a "battery with memory effects" when reference is made to nickel-cadmium batteries). Thus, applicant's charger is substantially more versatile and has a faster charge rate than the charger described by the National Bureau of Standards letter circular, supra; and the charged cell produced by applicant's charger has a substantially improved shelf life when compared to the shelf life of the battery produced by the prior art charger.

The reverse pulse charger of the invention

In one embodiment of applicant's invention, described below, the battery charger provides both a long and a short reverse pulse to the cells being charged.

The discharged battery is then connected to applicant's battery charger, which is described elsewhere in this specification. Thereafter, in the first step of the process, a multiplicity of charging pulses are provided to the battery.

A source of current pulses is connected to a switching means which, in turn, is connected to the battery. The switching means selectively furnishes a particular current pulse to the cell to be charged, depending upon the electrical condition of the cell at that time.

The current pulses used in this embodiment of applicant's charger preferably are direct-current pulses with a duration of at least about 1 millisecond and, preferably, from about 1 to about 8 milliseconds, as preferably conveniently derived from conventional alternating current power sources. It is preferred that the direct current pulses have a duration of from about 5 to about 7 milliseconds and, most preferably, of about 6 milliseconds. However, as will be apparent to those skilled in the art, one may also use filtered power sources which provide substantially longer pulse options.

The current pulses will have an average value which does not exceed about 40 percent of the initial capacity of the cell and, more preferably is from about 9 to about 20 percent of the initial capacity of the cell. The initial capacity of the cell is the current rating given to such cell by the manufacturer. Thus, e.g., AA alkaline cells are rated at 1.5 ampere-hours at the 8 hour rate; and the pulses used to recharge such a cell would typically be no greater than about 200 milliamperes average.

In this embodiment of the charger of applicant's invention, means are provided for determining whether any particular direct current pulse should be delivered through the switching means to the cell. The determining means measures the stored value of the voltage of the cell and thereafter compares it at a specified point in time in the discharge cycle (discussed below) with a reference voltage. If the stored value of voltage of the cell is below the reference voltage, the current pulse is delivered to the cell. If the stored value of voltage of the cell is above the reference voltage, the current pulse is not delivered to the cell.

The reference voltage of the cell is the final voltage desired in the charged cell; it is specified at 25 degrees Centigrade with an approximate negative temperature coefficient of from about −0.07 to −0.13 percent per degree Centigrade. Thus, for a manganese dioxide primary alkaline cell, the reference voltage is at least about 1.585 volts and, preferably, is from about 1.60 to about 1.65 volts; in one embodiment, such reference voltage is 1.62 volts at 25 degrees Centigrade.

In this embodiment of applicant's charger, in no case does the reference voltage ever exceed 1.7 volts for an alkaline manganese cell). When the process is used with a lead acid battery, the reference voltage limit is 2.45 volts per cell. When the process is used with a RAM cell, the reference voltage limit is 1.7 volts per cell. When the process is used with a nickel-cadmium cell, the reference voltage limit is 1.42 volts per cell, which in this case represents the transition voltage between current limited and constant current charging. In general, the reference voltage must not exceed the long-term, safe float voltage of the cell.

Figure 1B:
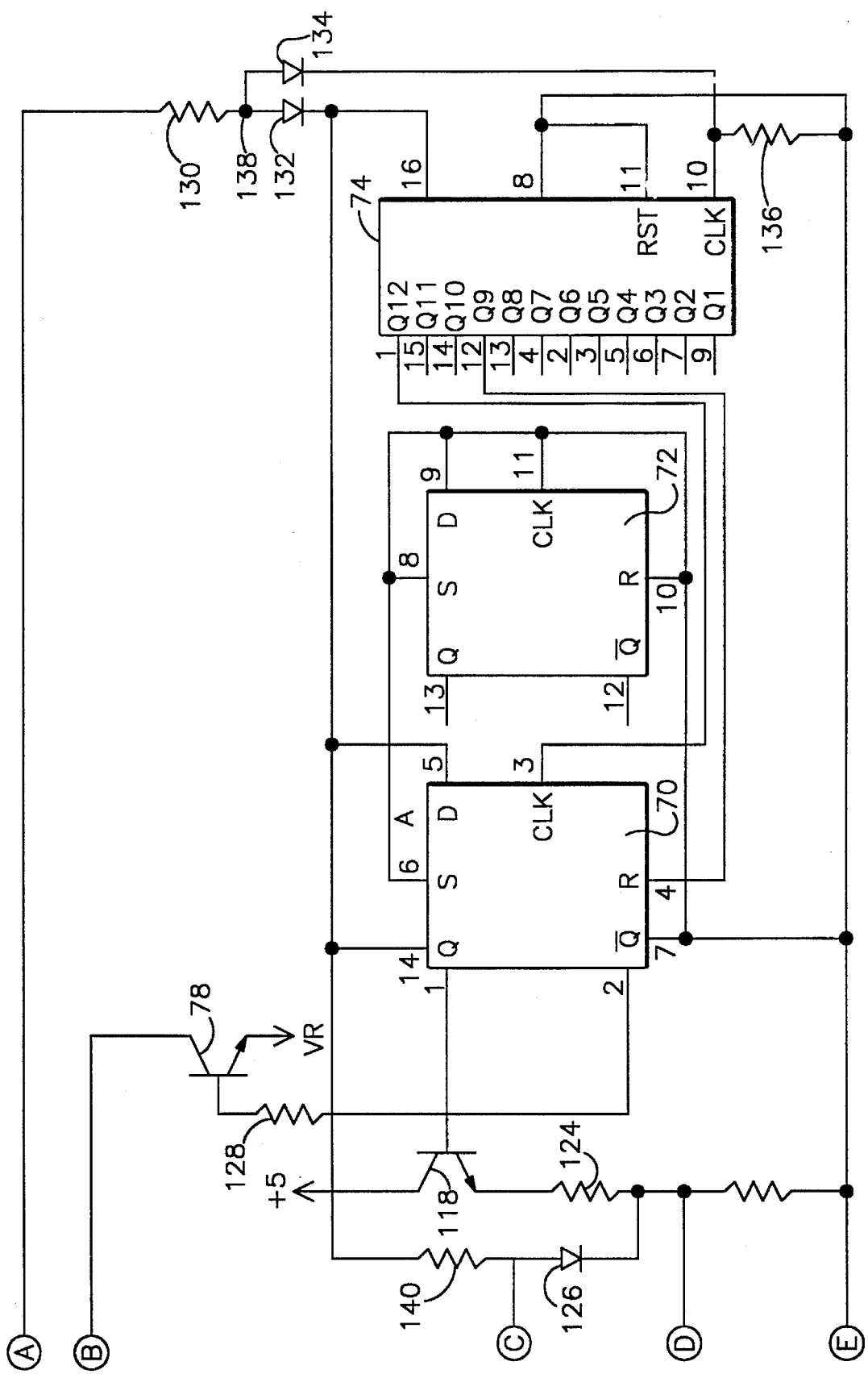

In one preferred embodiment, illustrated in FIG. 1, if the cell fails to accept and conduct a current pulse delivered to it by the switching means from the available source voltage, a small additional current path is provided to the cell supplying twice the source voltage. Without wishing to be bound to any particular theory, applicant believes that this additional current source insures initial chargeability of cells subject to prolonged discharge storage. As will be apparent to those skilled in the art, lead batteries subjected to prolonged storage after discharge often are resistant to the initiation of charging.

In this embodiment of applicant's charger, in addition to providing periodic direct current pulses selectively to the cell to be charged, the cell is periodically discharged. Pulses of direct current are periodically withdrawn from the cell. These pulses have a duration of from about 5 to about 35 percent of the duration of direct current charging pulses; and they also have a current value during discharge of from about 10 to about 25 percent of the average current value available from the charging pulses. Thus, by way of illustration, for a system clocked by a 60 hertz power source, which will provide an average current value of about 200 milliamperes for the charging pulse within the range of about 6 milliseconds, the discharge pulse typically will preferably have a duration of from about 1.0 to about 1.5 milliseconds and an instantaneous current value of about 40 milliamperes with a 120 hertz repetition rate.

In general, the discharge pulse represents a loss of from about 3 to about 8 percent of the available charger energy.

In addition to providing short charge pulses and withdrawing shorter discharge pulses from the cell, the charger of this embodiment of applicant's invention periodically also terminates the charging process and provides continuous discharge of current from the cell for a relatively long period of time.

The duration of the "continuous" discharge pulse will be at least about 0.5 seconds and, more preferably, at least about 1.0 seconds.

The current value withdrawn during the long pulse discharge is generally from about 10 to about 25 percent of the average current value available from the charging pulses. In one embodiment, illustrated in FIG. 1, the current value of the long discharge pulse is substantially identical to the current value of the short discharge pulse. In this embodiment, shared discharge components may be utilized.

It is preferred that from about 2 to about 15 percent of the total charging time be represented by periodic long discharge pulses. Thus, by way of illustration, when the long pulse discharge has a duration of about 2 seconds, the time between long pulses is about 30 seconds.

In general, when the charger of FIG. 1 is used with alkaline batteries, and with nickel-cadmium cells, and with RAM cells, the time between long pulses is preferably from about 10 to about 60 seconds; with the nickel-cadmium cells, and the RAM cells, comparable pulse patterns to those used with the alkaline cells may be used. By comparison, with lead-acid batteries, the duration of the long pulses is from about 15 to about 30 seconds, and the time between long pulses is from about 1.5 to about 5.0 minutes.

Without wishing to be bound to any particular theory, it has been observed that the employment of the short pulse pattern and the resulting improvement in charge acceptance beyond initial acceptance levels (typically 40 percent in alkaline cells), combined with the long pulse pattern (which permits incremental recovery of cell capacity of cells subject to deep discharge or discharged storage on successive recharges) allows appropriate cell manipulation without requiring excursions beyond the safe float voltage limits of the cells.

In the embodiment of applicant's charger illustrated in FIG. 1, means are provided for measuring the value of, and storing the value of, the voltage of the cell at the point in time whenever discharge is terminated. At this point in time, the information regarding the cell voltage is used by a comparator to determine whether it exceeds the reference voltage. As indicated above, when cell voltage at the termination of discharge exceeds the reference voltage, no current pulse is delivered to the cell (but discharge pulses are still withdrawn from the cell on schedule regardless of the value of the cell storage voltage.) Conversely, when the stored cell voltage is less than the reference voltage, the current pulse is allowed to flow to the cell.

FIG. 1 is a schematic diagram of one preferred embodiment of the battery charger 10 of applicant's invention. The embodiment of FIG. 1 is suitable for charging two alkaline cells independently. It will be apparent to those skilled in the art that, when battery charger 10 is to be used with other types of cells (such as lead acid cells), different time constants and current values must be provided by the circuit.

Referring to FIG. 1, one alkaline battery may be connected between point 12 and common bus 14, and another alkaline battery may be connected between point 16 and common bus 14. It will be apparent to those skilled in the art that one may design a similar circuit adapted to charge 4, 8, 20, or any arbitrary and desired number of cells.

Referring again to FIG. 1, alternating current preferably is provided through mains transformer 18 to diodes 20, 22, 24, and 26. In one embodiment, the alternating current is standard 120 volt/60 hertz mains power. In another embodiment, the alternating current is conventional 220 volt/50 hertz mains power. Other alternating current sources also may be used.

The alternating current provide to diodes 20 and 22 is rectified. The direct current thus produced is connected to common bus 14. The main positive bus 28 is taken from the center tap 30 of the secondary of transformer 18.

Diodes 24 and 26 provide a rectified positive voltage to bus 32, which is about twice as great as that voltage on bus 28. The positive voltage on bus 32 may be used to power comparators 34 and 36 and to provide the source for the resistant cell breakdown voltage through resistors 38 and 40.

As indicated in the specification, if a cell connected between bus 14 and either point 12 or 16 fails to conduct, then resistors 38 and/or 40 will provide voltage from bus 32 to the nonconductive cell by reversing isolating diodes 42 or 44. This increased voltage generally is sufficient to initiate charge acceptance within the cell.

Means for comparing the voltage of either cell with a reference voltage derived from the network comprised of diode 46 and resistor 48 is also provided by the circuit. In the embodiment illustrated in FIG. 1, such a means is provided by a current from bus 32 which passes through isolation diode 46 (which functions as a reverse discharge isolator), and current limiting resistor 48 to zener diode 50; this current is filtered by capacitor 52. Zener diode 50 typically has an approximately 5 volt breakdown voltage to provide appropriate supply voltage for the digital integrated circuits 70, 72, and 74 and a well-regulated, zero-temperature coefficient source for the second stage regulator, consisting of elements 54 through 68. Current from the voltage provided by elements 50 and 52 flows from resistors 54 and 56 in series, and through diodes 58 and 60 in series with them.

Diodes 58 and 60 provide a secondary regulator to help insure minimal line voltage perturbation, and they provide a large negative temperature coefficient. Thus, by choosing the relationship between resistors 54 and 56, a desired temperature coefficient may be selected.

The junction 76 of resistors 54 and 56 is the source of current for resistors 62, 64, and 66 in series, with variable resistor 64 acting as the voltage reference adjustment. Capacitor 68 acts as a secondary filter for the reference voltage.

The reference voltage is delivered to comparators 34 and 36 through transistor switch 78 under the control of the timing circuits to be described later.

The cell voltage at points 12 and 16 is tracked by transistor switches 84 and 86, respectively, and stored on capacitors 80 and 82, which are connected to the inverting inputs of comparators 34 and 36. In the embodiment illustrated, transistors 84 and 86 are controlled by the outputs of comparators 34 and 36 through resistors 88 and 90 and, thus, are automatically turned on when main battery pulse charging transistor switches 92 and 94 are deactivated.

Primary charging current pulses to the batteries are provided through current limiting resistors 96 and 98, which are shunted by light-emitting diodes 100 and 102, which are in turn current-limited by protective resistors 104 and 106; and they act as charging activity displays.

Discharge pulses from cells connected at points 12 and 16 flow through isolation diodes 108 and 110, and discharge current control resistors 112 and 114, when transistor switch 116 is on. Transistor switch 116 is on when either transistor 118 turns it on through resistor 124, or transistor 120 permits current to flow through resistor 140 and diode 126. Transistor 120 will prevent current through resistor 140 from reaching transistor 116 by shunting it to common bus 14 whenever bus 32 is sufficiently positive to power transistor 120 through resistor 122. In other words, transistor 120 acts as a zero crossing enable switch for transistor 116 to provide the brief discharge pulses through resistors 112 and 114.

The two-second discharge pulse is provided by powering transistor 116 through resistor 124 from transistor 118 when flip-flop 70 is turned on (binary 1). At that time, flip-flop 70 also disconnects voltage reference switch 78 from the non-inverting inputs to comparators 34 and 36.

The additional flip-flop 72 is unused, and its inputs are appropriately connected to common negative bus 14 to prevent noise response in this unused half of the integrated circuit containing flip-flop 70.

Flip-flop 70 is, in turn, controlled by twelve-bit binary counter 74, which turns it on when output Q12 of counter 74 transits positive and turns it off when output Q9 of counter 74 becomes positive. Thus, flip-flop 70 is on only from the positive edge onset of Q12 to the next positive output of Q9 (which is about fifteen percent of the time).

Counter Q12, in turn, counts 120 pulses per second (in the case of 60 hertz source) derived from bus 32 through resistor 130, diode 134, and resistor 136 connected to its clock input. Junction 138 between resistor 130 and diode 134 is clamped to the plus-five volt power supply line through clamp diode 132 in order to prevent excessive voltage from being applied to the clock input of counter 74.

By way of illustration and not limitation, certain conventional and widely available components are suggested below for use in device 10. However, it will be readily apparent to those skilled in the art that other, comparable, commercially available components may be substituted for those described with no substantial adverse effect.

It is preferred that all of the resistors in device 10 be commercially available carbon-film resistors, with the exception of resistors 96 and 98 (which are 2.0 watt resistors, such a wire-wound, metal-film, or carbon-film 2.0 watt resistors).

It is preferred that each of the diodes in device 10 be a 1N4001 diode, or be comparable thereto. The zener diode 50 should preferably be 1N4733A zener diode, or be comparable thereto. Light-emitting diodes 100 and 102 are preferably selected on the basis of their appearance.

PNP transistors 84 and 86 are preferably 2N4403 transistors, or any transistor even remotely similar thereto. NPN transistors 92, 94, 116, 118, 120, and 78 are preferably 2N4401 transistors, or any comparable transistor.

Comparators 34 and 36 may be halves of a LM358 integrated circuit, or may be virtually any dual operational amplifier such as e.g., 1458. Alternatively, comparators 34 and 36, when used in larger system with additional comparators, could be part of a LN324 quad operational amplifier (or of a similar device).

Flip-flops 70 and 72 are marked to correspond with the pin layout of CMOS part 4013. Binary counter 74 is shown as a CMOS part 4040.

Filter capacitors 52 and 68 are typical small electrolytic capacitors. Information storage capacitors 80 and 82 are preferably solid electrolyte tantalum units.

For a system designed for no more than four AA-size cells to be simultaneously charged, transformer 18 should preferably be a half-by-half core medium quality (M19) step-down transformer with a secondary voltage of 10.8 volts center tap open circuit.

For a system requiring larger capacity (either more cells or larger cells), a larger transformer core will be required to provide the needed power. Voltage need not be increased unless groups of cells are to be charged in series.

The charger illustrated in FIG. 1 may be used to recharge Rechargeable Alkaline Manganese cells. As is known to those skilled in the art, Rechargeable Alkaline Manganese cells are currently available (as "RAM" cells), from the Battery Technology Inc. corporation of Missasauga, Ontario, Canada. These RAM cells are specifically intended for recharging, and the significantly improved cycle life has been provided by modifying certain characteristics of primary alkaline cells.

Low temperature operation, peak charge and discharge current, and total capacity of these cells are somewhat reduced from their primary cell counterparts.

In the process of this invention, if used with RAM cells, no significant change in charger 10 is required. However, the reference voltage used for these cells is recommended to be 1.65 volts while primary cells, for which this system is intended, provide improved charge storage seal life at 1.625 volts.

The battery charger illustrated in FIG. 1 also may be used to recharge lead acid batteries. These lead acid batteries are well known to those skilled in the art and are described, e.g., on pages 142–187 of the Mantell book. These batteries are available as single cells, but they generally are provided as multi-cell preassembled batteries. While accessible liquid electrolyte batteries are still widely available, sealed lead acid (SLA) batteries have become an ever-increasing portion of the market, both as flooded cells (typical of automotive applications) and starved (recombinant) or gel cells, typical of industrial applications. Thus, in applicant's process, a typical battery charger appropriate for these applications would be designed for a multi-cell series configuration, with 6 and 12 volt nominal (i.e., 4- and 6-cell groups) being the most common. An appropriate set of constants by the same architecture shown in FIG. 1 would be a reference voltage 2.3 volts per cell, an average available charging current of from about 1 to about 50 percent of the nominal ampere-hour capacity, a charge withdrawal ratio comparable to that used with the alkaline cells, and time constants very much longer (as discussed elsewhere in this specification).

The battery charger illustrated in FIG. 1 also may be used to recharge nickel-cadmium or nickel hydride batteries. These batteries differ fundamentally in their charge requirements from all of the batteries previously discussed. They are designed for constant current recombinant standby service. While many schemes are available to enhance rechargeability, generally referred to as delta-T or delta-V systems, these approaches are generally a bit tricky and require battery and charger to be an integrated design. In applicant's system, for improved nickel-cadmium performance and no zinc/manganese dioxide capability, a modification of the device 10 which provides constant current in place of the no-charge portion of the cycle (when the comparator indicates that the voltage exceeds the reference voltage) will work very effectively if the reference voltage is set to about 1.42 volts per cell at 25 degrees Centigrade with a negative temperature coefficient of 0.1 percent per degree Centigrade. Charging current can be as high as twice the nominal ampere capacity of the cell for completely conventional cells, without requiring high-temperature or fast-charging special construction cells. When the sampled voltage exceeds the reference voltage, a current of about 10 percent of the ampere hour capacity for nickel-cadmium batteries is generally appropriate. When nickel-metal hydride batteries are being charged under these conditions, a current of about 2.5 percent of the ampere hour capacity is recommended. The recombinant limit of fully charged nickel-metal hydride cells is described by their manufacturers as being substantially lower in value than the recombinant current capacity of a nickel-cadmium cell of a similar physical size.

Another dual pulse reverse current charger

Figure 2:
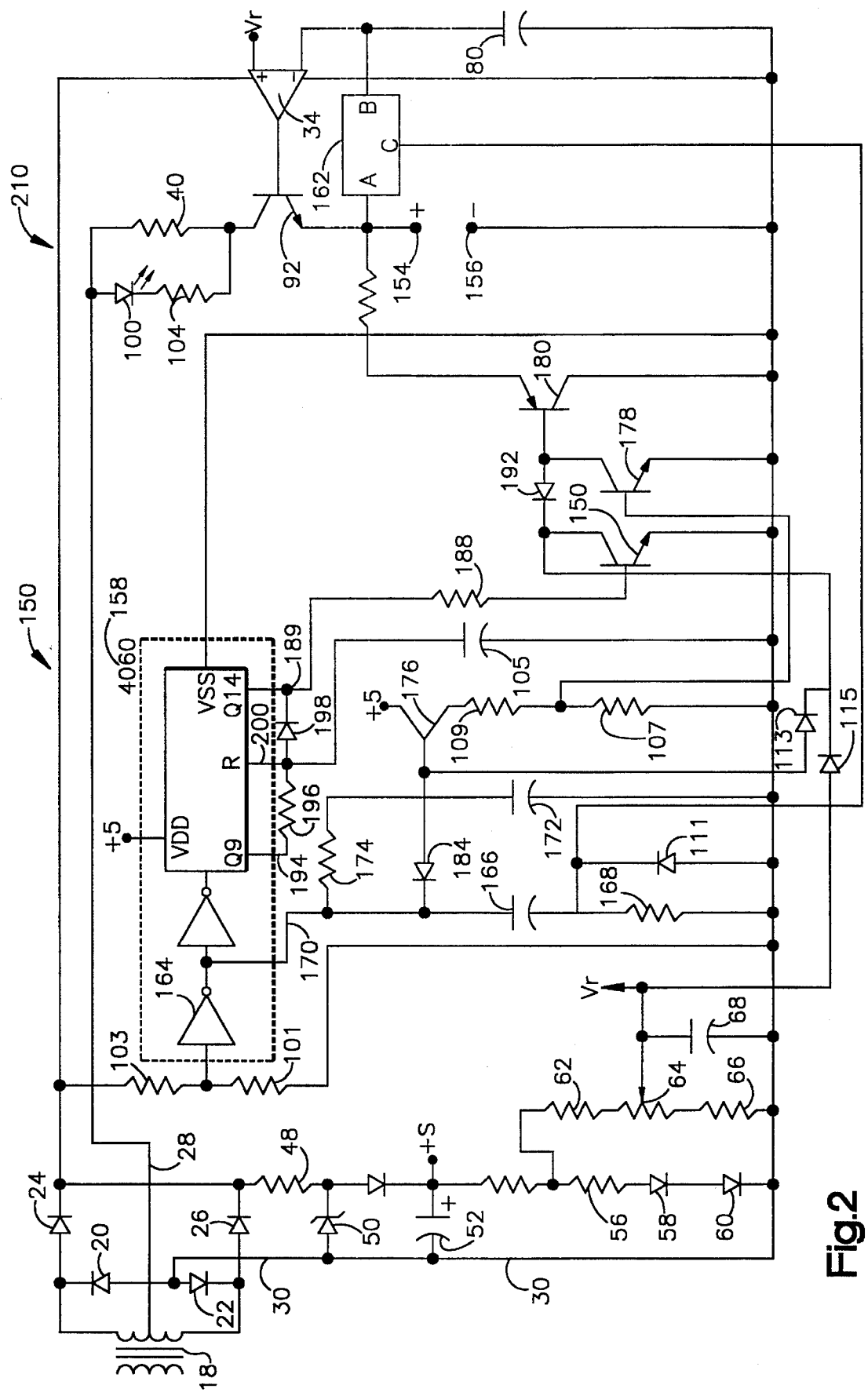
FIG. 2 is a schematic of another preferred battery charger disclosed in the '386 application utilizing a dual pulse reverse current pattern.

Another embodiment of a dual pulse reverse current charger is illustrated in FIG. 2. Referring to FIG. 2, it will be seen that battery charger 150 is comprised of mains transformer 18, which provides power at an appropriate voltage for a single cell (not shown) which may be attached between positive terminal 154 and negative terminal 156. In general, it is preferred that the transformer voltage be from about 11 to about 12 volts center tapped RMS (root mean squared).

The circuit of FIG. 2 is very similar in many respects to that illustrated in FIG. 1, and it shares many common circuit elements. However, it differs in the respects described below.

Referring again to FIG. 2, the timing circuit 158 is implemented by a 4060 integrated circuit which provides the sample strobe pulse to CMOS switch 162 which, typically, may be a section of a 4066 integrated circuit by differentiating the output of the input inverter 164 of the 4060 integrated circuit with a time constant whose RC value is equal to the product of capacitor 166 and resistor 168. This occurs at the leading edge of the inverted (positive) pulse at 170 synchronous with the main zero crossing.

The "short high current" discharge pulse is generated by the same pulse with a delay equal to the product of capacitor 172 and resistor 174, amplified by transistors 176 and 178. These transistors typically are 2N4401 NPN transistors which, in turn, power PNP transistor 180 (which may be type 2N4403) and thereby connects resistor 182 through transistor 180 to terminal 156.

The current through resistor 182 will be equal to the voltage on the battery under charge (not shown) minus the base emitter voltage drop of transistor 180, divided by the value of resistor 182. The duration of this discharge event will be equal to the duration of the positive pulse at point 170 minus the delay caused by the time constant 172–174, since the end of the pulse will be provided promptly through diode 184. A similar course of events will occur approximately once a minute when the output 186 of stage Q14 is applied through resistor 188 to NPN transistor 150 (which may be a 2N4401). However, the additional diode drop of diode 192 will reduce the voltage across resistor 182 by about 600 millivolts when compared to the effect of driving via transistor 178. Thus, the discharge current drained by this path will be roughly one-half of that removed by the fast pulse previously described. The duration of the pulse will be set by the choice of the output 194 used to reset IC 158 via resistor 196. Diode 198 clamps the reset 200 until Q14 output 186 becomes positive; then reset occurs when output 194 subsequently becomes positive. Therefore, the duration of the long pulse can be selected by choosing the appropriate reset output source ($Q^9$ in FIG. 2), which yields approximately 2 seconds.

In the battery charger 150 of this FIG. 2, the charging current is controlled by resistor 40. Although no high voltage injector is illustrated in this embodiment, it will be apparent to those skilled in the art that such injector may be used.

Referring again to FIG. 2, it will be seen that battery charger 150 also is comprised of a voltage divider comprised of resistors 101 and 103, which provides the synchronous input to the counter 158 for zero-crossing a.c. line synchronization. Resistor 196 and capacitor 105 form a noise filter between Q9 and the reset of integrated circuit 158. Resistors 107 and 109 connect transistor 176 to transistor 178. Diode 111 provides a prompt recharge path for capacitor 166, and diodes 113 and 115 clamp $V_r$ and the input to transistor 176 during the long pulse discharge.

Another embodiment of the battery charger

Figure 3:
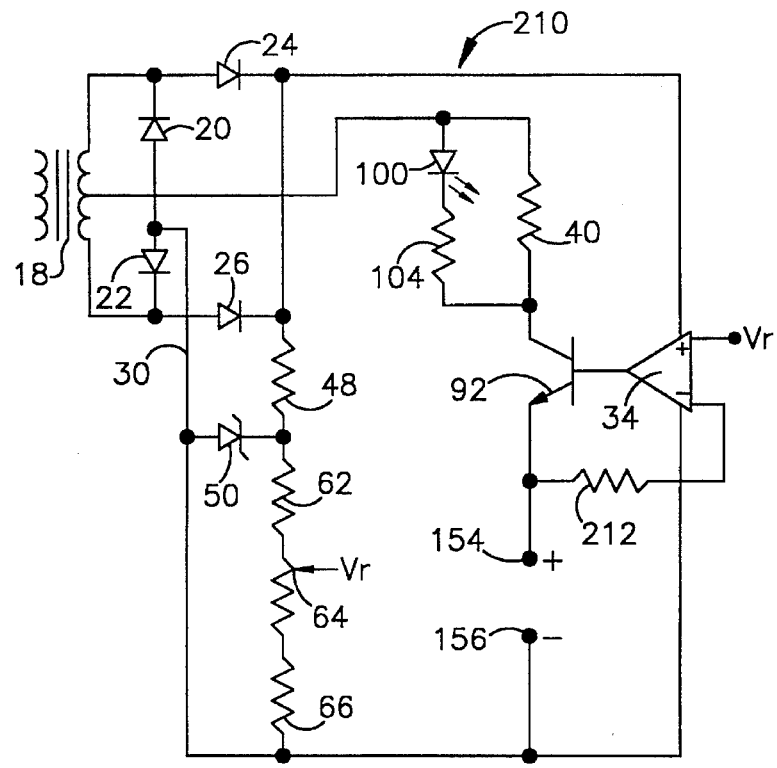
FIG. 3 is a schematic of another preferred battery charger disclosed in the '386 application.

FIG. 3 illustrates another preferred battery charger 210 which is within the scope of applicant's invention. As will be seen from FIG. 3, main transformer 18 provides power at an appropriate voltage (preferably in the range of from about 11 to about 12 volt center tapped r.m.s.) for charging a single cell (not shown) attached between terminals 154 and 156. Current is provided by diodes 20 and 22 and the centertap 30 of the secondary of transformer 18 through current control resistor 40 (approximately 6 ohms in this illustration, and controlled by series switch 92 [2N4401 or similar transistor] ). A light emitting diode 100 in series with resistor 104 acts as a "pilot light" to display "activity" in resistor 40.

Transistor 92 is controlled by the output of comparator 34, which could be the output of a low cost operational amplifier (such as the 741 [single] or the LM358 [dual] or the LM324 [quad]). The comparator 34 responds to the difference between the cell voltage applied to its inverting input (−) and a reference voltage applied to the noninverting input (+). As long as the battery voltage is less than the reference voltage, the corporator 34 output is high, switching on transistor 92 and allowing charging current to flow through resistor 40. Once the battery voltage is equal to the reference voltage, the corporator 34 will restrict the base current into transistor 92 and the charging current into the cell being charged.

The reference voltage is derived from a voltage divider 62, 64, 66 connected to a stable voltage source 50. Zener diode 50 is powered by diodes 24 and 26 through current control resistor 48. The higher voltage available from diodes 24 and 26 (compared to the centertap) broadens the "conduction" angle of diode 50 in this unfiltered, economical, and reliable system. Diodes 24 and 26 also provide power to the comparator 34 to insure sufficient "output swing" for the low cost operational amplifier (comparator 34) to saturate transistor 92.

There are several limitations to this system. Diode 50 can be chosen (a low voltage Zener diode) to have almost the required negative temperature coefficient. Unfortunately, as is known to those skilled in the art, low voltage Zener diodes have relatively poor dynamic resistance values, and line voltage variations would produce unacceptable reference voltage variations. Thus, diode 50 should preferably be a low impedance device (in the range of 5 volts, with substantial operating currents, perhaps 50 milliamperes, to guard against "soft knees" often found in low cost devices). Unfortunately, in this voltage range, temperature coefficients are generally near zero. This problem is addressed by the circuit of FIG. 4.

A modified battery charger

Figure 4:
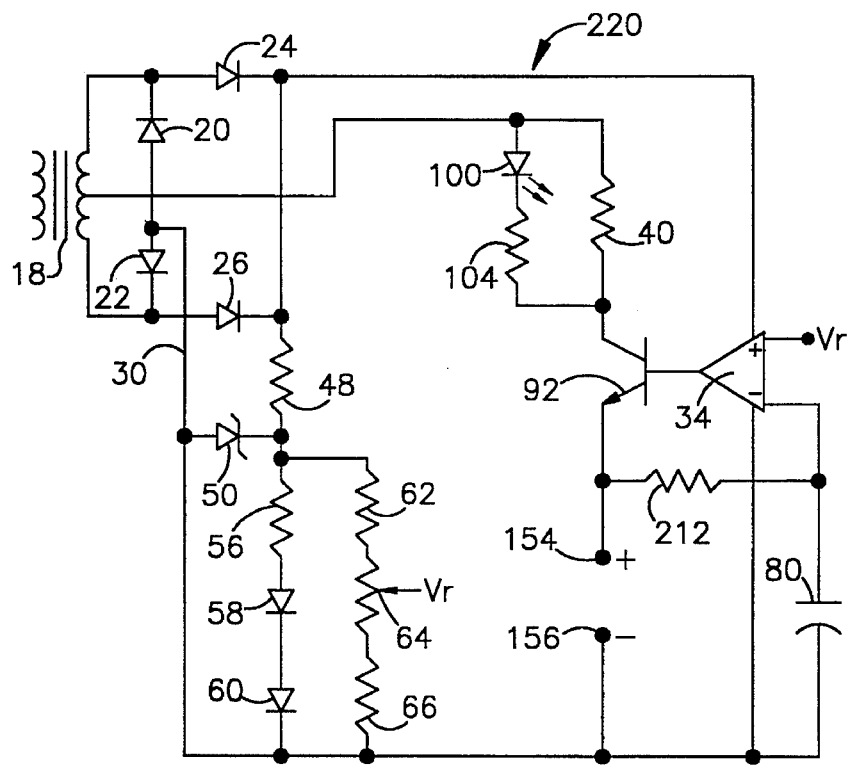
FIG. 4 is a schematic of modified version of the battery charger of FIG. 3.

FIG. 4 is an improved version of the battery charger of FIG. 3. Referring to FIG. 4, it will be seen that battery charger 220 provides a reference voltage source with certain advantages. Diode 50 is a diode which may be, e.g., the 1N4733A type and which provides a stable (but approximately zero temperature coefficient) voltage source to resistors 54 and 56 and diodes 58 and 60 in series, wherein diodes 58 and 60 are conventional, forward-biased silicon diodes (such as, e.g., 1N4001) which exhibit a large negative temperature coefficient and also provide further voltage stabilization. Thus, the ratio of the resistance values of resistors 54/56 provides a selection mechanism for the temperature coefficient from near zero (as resistor 54 approaches zero ohms) to excessively negative (as the resistance of resistor 56 decreases in value (resistors 62, 64, and 66 are assumed to be large compared to the resistance of resistors 54 and 56 for the sake of simplicity). Resistor 62 is selected to center resistor 64 at the desired reference voltage, and resistors 62 and 66 set the adjustment "span" of resistor 64.

Resistor 212 acts as a current limiter and safety resistor (against failure of comparator 34) in this unfiltered system where 120 times per second (for 60 hertz mains power) power is provided to comparator 34 and the reference voltage network synchronously with the availability of charger power to resistor 40 and transistor 92. Thus, the system will charge when it can (if required) without the addition of filter capacitors (energy storage), with a resultant savings in cost and reliability.

A drawback of this design, if charging time is important, is the effect of comparing battery voltage directly to reference voltage in a system with a nonconstant charging current (which peaks 120 times per second at the crest of the mains sine wave). Each current peak produces a cell voltage peak equal to the "true" cell voltage plus the internal resistance times current (IR) value of the instantaneous charging current. Thus, as the cell approaches full charge, the "peak" voltage will exceed the reference voltage before the cell is fully charged, and comparator 34 will react to reduce drive to transistor 92 and, thus, current to the cell near the peak of the sine wave voltage. This will result in a reduced charging rate toward the end of charge and an extended charging time.

Referring again to FIG. 4, the section to the right of diode 100 and resistor 104 may be repeated any number of times to provide simultaneous, individually controlled charging of any desired number of cells, provided the power components are scaled appropriately.

FIG. 4 thus illustrates a simple modification of the configuration of FIG. 3 which partially overcomes the "artificial" rate limitation discussed above via the addition of capacitor 80. If the product of resistor 212 and capacitor 80 is long compared to the mains half cycle period (8.33 milliseconds in this example), the "average" battery voltage will be compared to the reference voltage.

Figure 5A:
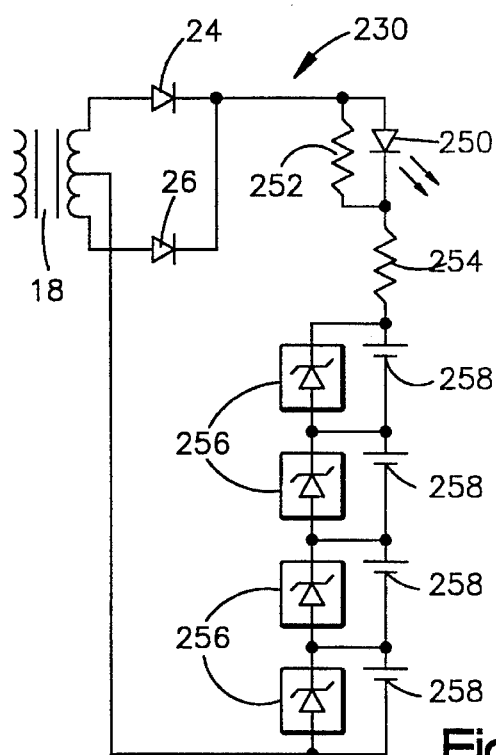
FIG. 5 is a schematic of a battery charger disclosed in the '386 application suitable for charging a series connected group of cells with individual shunt regulation.
Figure 5B:
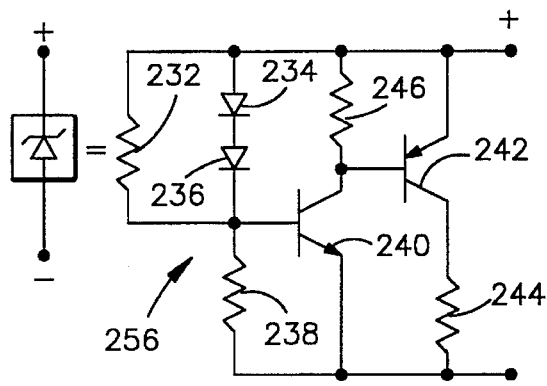

The battery charger illustrated in FIG. 5 represents another approach to cell charging. A series string of cells 258 (i.e., a battery consisting of multiple cells in series) is provided with a common current from mains transformer 18, rectifier diodes 24 and 26, and resistor 254. Light emitting diode 250 (with excess current shunted by resistor 252) is simply a convenient "power" indicator.

Each cell 258 is shunted by a "pseudo-Zener" which is made from network 256, illustrated at the lower left of FIG. 5. Diodes 234 and 236, and the base emitter voltage of transistor 240 are the primary sources of the negative temperature coefficient and, combined with resistor 238, the "Zener voltage." Resistor 232 provides a simple means of reducing the excessive negative temperature coefficient; and resistor 244 is a simple means for removing the bulk of the circuit dissipation from the transistor 242 (which may be, e.g., a 2N4403, a common PNP complement to the 2N4401 which provides adequate NPN performance).

It will be apparent to those skilled in the art that, with applicant's invention, it is possible to charge alkaline cells in series and to control the individual cells with simple, economical shunt regulators, achieving good regulation and negative temperature coefficients without the need for any external power source for each regulator.

Another series charged shunt regulated charger

Figure 6A:
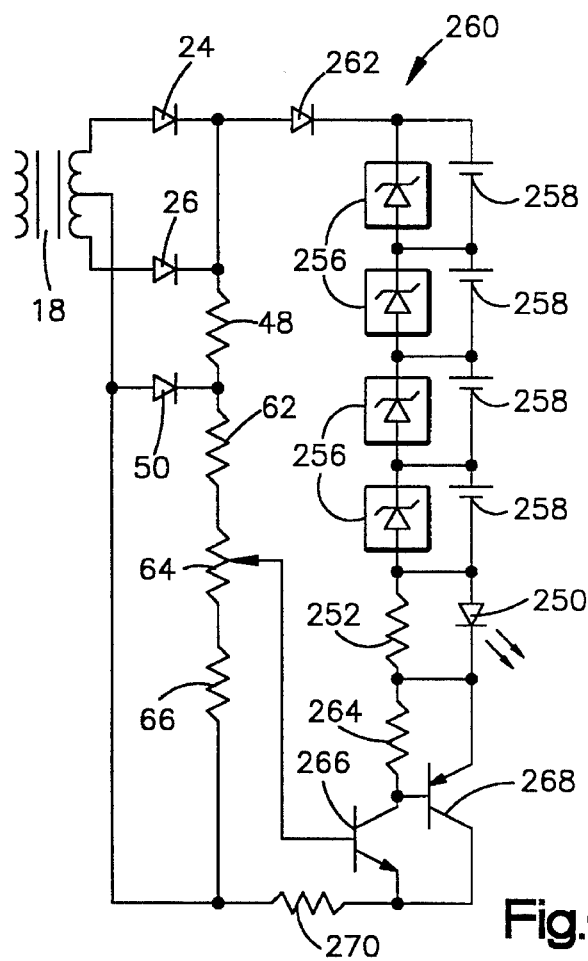
FIG. 6 is a schematic of a modified version of the battery charger of FIG. 5.
Figure 6B:
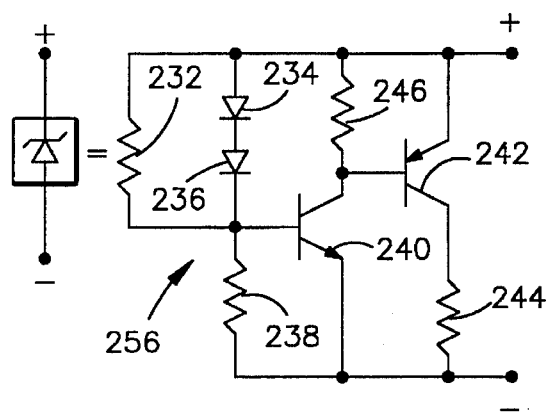

Another series charged shunt regulated charger 260 is illustrated in FIG. 6. Referring to FIG. 6, it will be seen that battery charger 260 is an improvement upon the system of FIG. 5. In the device of this FIG. 6, resistor 254 is replaced with a constant current generator comprised of transistors 266 and 268 and resistors 264 and 270, whereby the reference voltage derived from resistor 64 sets the current through resistor 270 and, thus, the cells 258. The advantage of this approach, aside from the lower voltage requirements (and, thus, lower cost, less heat, and higher utilization efficiency) for transformer 18, resistor 254 or its equivalent (266, 268, 270) is the ability of the device to adjust the current to "trim" the regulator voltage to a desired value. The relative behavior of diodes 234 and 236 is very reproducible, but the overall setpoint requires a production adjustment.

It will be apparent to those skilled in the art that the reference voltage is a single, approximately zero temperature coefficient, voltage source, diode 50. Thus, charging current is fixed independently of temperature, and the negative temperature coefficient is provided by the design of the "pseudo Zener" 256. It will also be apparent that diode 262 functions as an "isolator" between the "battery" and the rest of the system which, in this circuit, would drain current from the battery if mains power were to be removed.

Another modified shunt regulated charger

Figure 7A:
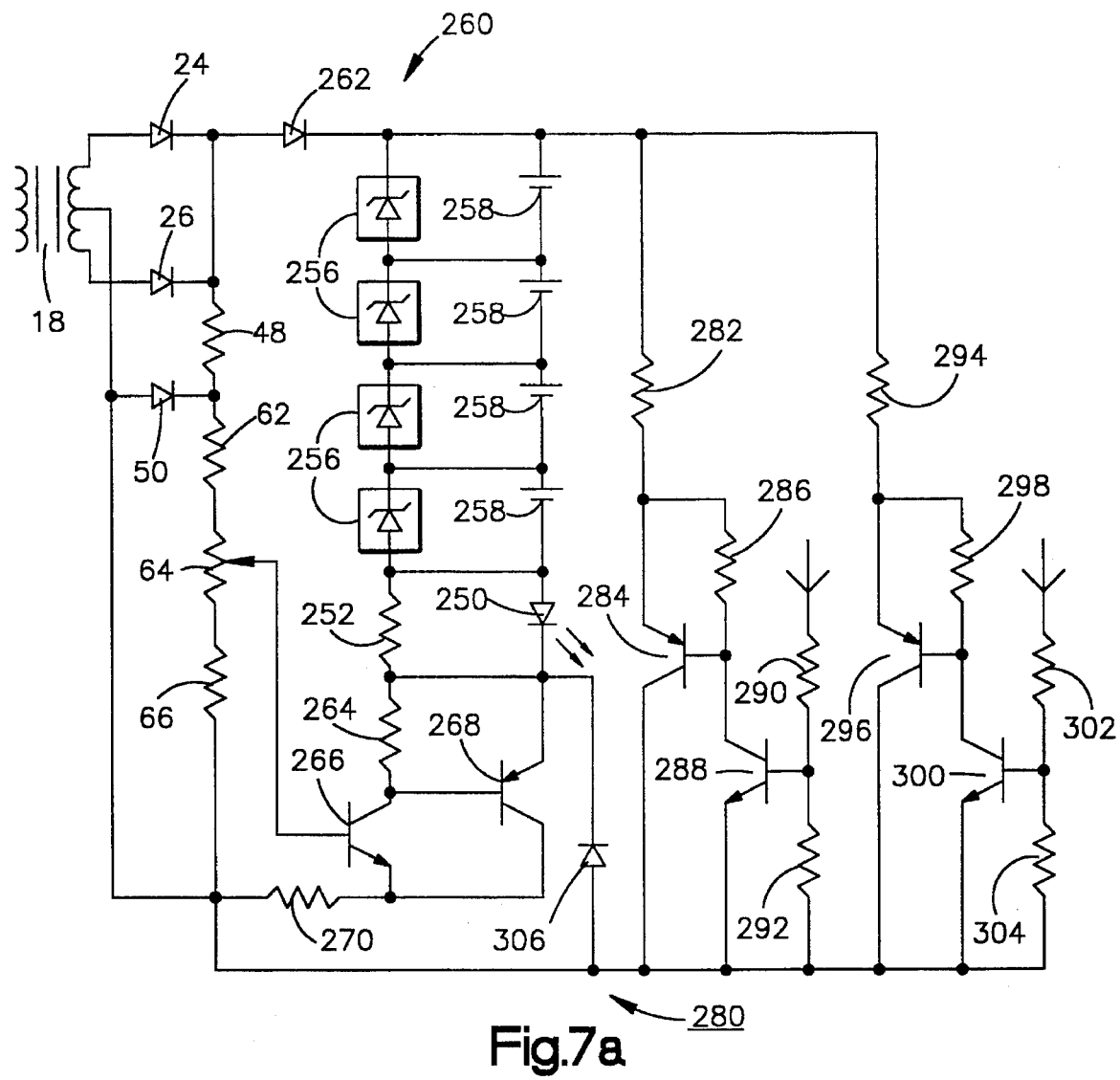
FIG. 7 is a schematic of a modified version of the battery charger of FIG. 6.
Figure 7B:
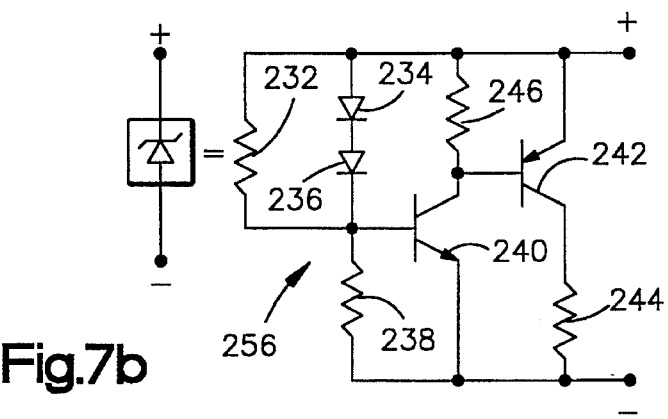

FIG. 7 illustrates a battery charger 280 in which, because of the addition of a reverse current diode 306, can impress reverse current pulse patterns upon the entire series string of cells 258. A pair of drive pulses, produced from a timing network substantially similar to the timing network of the device of FIG. 2 (not shown), controls reverse current, as determined by resistor 282 through input via resistor 290 and through resistor 294 through input via resistor 302. It will be apparent to those skilled in the art that the reference voltage must be appropriately suppressed (see FIG. 2) for pulses longer than about 1 millisecond, centered at the mains zero crossing.

An individual cell shunt regulated device

Figure 8:
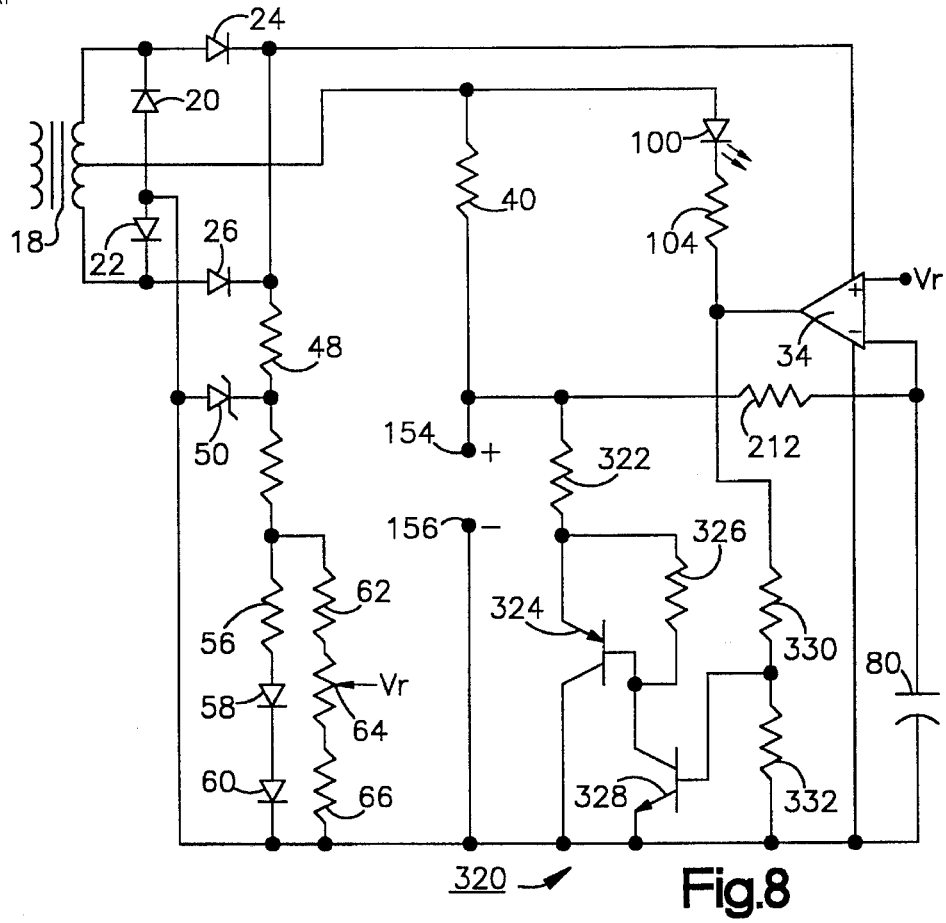
FIG. 8 is a schematic of a shunt-regulated battery charger disclosed in the '386 application.

The device illustrated in FIG. 8 is a special purpose variant of the device of FIG. 4 in which the time constant produced by resistor 212 and capacitor 80 is relatively short compared to the 8.33 milliseconds time constant of the mains half period; and this RC network is suitable for high frequency noise control. The feedback from this network is "real time" (see FIG. 4) and is not averaged. When the cell voltage of this embodiment reaches the reference voltage, even momentarily, the cell current from resistor 40 is diverted through resistor 322 and transistor 324, controlled by transistor 328 from the output of the comparator 34 through resistor 330. Thus, as will be apparent to those skilled in the art, the output can be "clamped" at the reference voltage with negligible overshoot, and the charging will be relatively slow. However, the very small charging current towards the end of the charge allows diffusion equilibrium to essentially remove concentration gradients without reverse current pulses. The charger of this device is relatively "gentle," with substantially no overshoot and a taper to virtually zero current as full charge is approached; thus, little gas is evolved. Thus, for cells intended for prolonged standby, without large dendrite formation, and in applications where slow charging is acceptable, this device represents a practical standby power source for use with, e.g., burglar and fire alarms, emergency lighting, etc. It will be apparent to those skilled in the art that the series switch configuration of FIG. 4 could also be adapted for this purpose.

An economical battery charger

Figure 9:
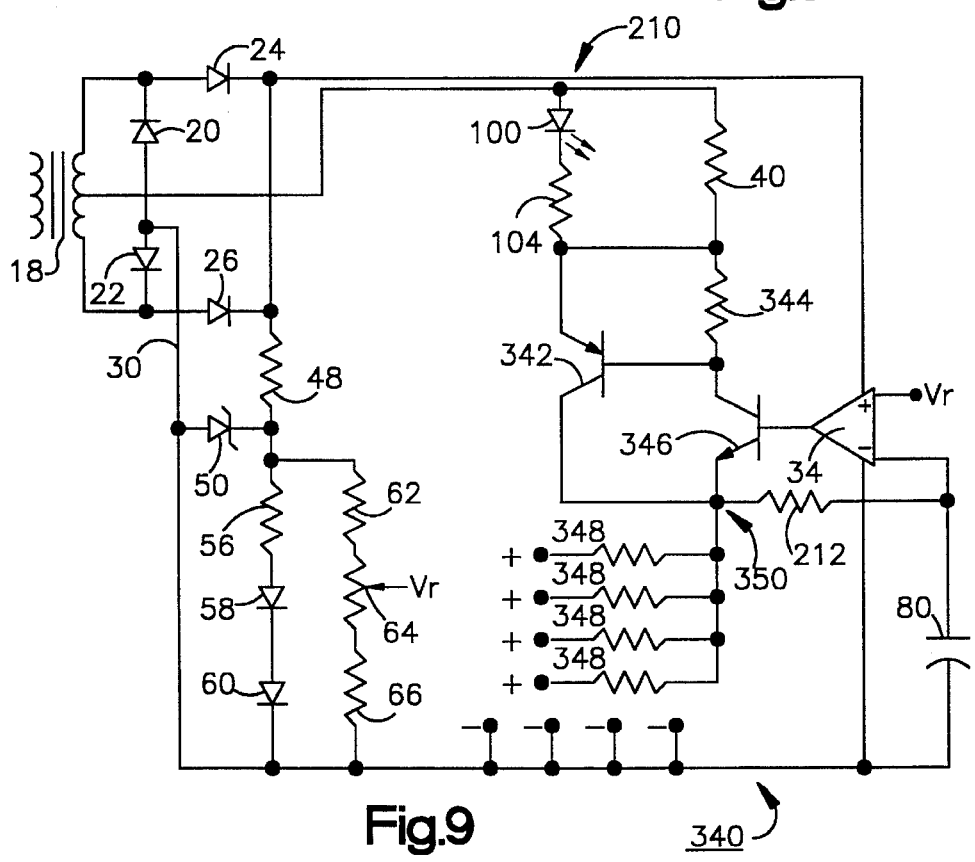
FIG. 9 is a schematic of another preferred battery charger disclosed in the '386 application.

FIG. 9 illustrates a relatively inexpensive battery charger 340 which may be produced in accordance with applicant's invention. The closed loop control system of this invention provides another means for controlling the individual cells to be charged.

Referring to FIG. 9, it will be seen that a single comparator 34 is used to control the voltage appearing at the common end 350 of the series battery resistors 348. It is the voltage at common end 350 which is controlled by comparison to the negative temperature coefficient reference voltage applied to the noninverting (+) input of comparator 34. This voltage is "averaged" by the RC time constant of resistor 212 and capacitor 80 and applied to the inverting input (−). As will be apparent to those skilled in the art, individual cell control may be approximated by a single, relatively high current controller consisting of comparator 34, transistors 342 and 346, resistor 344, and total current control resistor 40. If the output at point 350 is adjusted to the desired final output voltage (such as 1.625 volts), then the single controller is capable of controlling all of the current required to charge all of the cells, and the slowly tapering charge and risk of current hogging by a damaged cell may be acceptable. The larger the resistance of resistor 348, the better the "final charge quality," i.e., individual control, but the slower the charge. A value in the range from about 1 to about 2 ohms for AA cells provides and acceptable approximation of individual cell regulation at minimal cost.

The output of the charger of this invention

In FIGS. 1–9, applicant has illustrated nine different means for achieving the aims of his invention. Many other devices will be apparent to those skilled in the art which are able to achieve the same aims; they are also within the scope of the invention.

As will be apparent to those skilled in the art, each of the aforementioned devices shares certain characteristics such as, e.g., means for producing a direct current voltage at 25 degrees centigrade of from about 1.6 to about 1.7 volts, means for individually limiting the voltage applied to each cell being charged to a direct current voltage at 25 degrees centigrade of from about 1.6 to about 1.7 volts, means for individually limiting the current applied to each cell being charged to a current of less than about 800 milliamperes per cell, and means for individually and continuously varying the current applied to each cell.

Additionally, when the battery charger is used to charge alkaline batteries, means are provided for limiting the maximum current supplied to each cell, independent to the cell's state of charge, to a value consistent with the cell life requirements. In general, it is preferred to limit this current value to no more than about 400 milliamperes and, more preferably, no more than about 200 milliamperes.

As will be apparent to those skilled in the art, applicant's battery charger is able to accomplish the aforementioned goals with as few as only one power source per battery charger, regardless of how many cells are being charged by the charger, and regardless of whether the cells are connected in series to form a battery. It will be apparent, however, that one may use multiple power sources in the battery charger. Such a course of action is not seen to be advantageous.

Applicant's device is comprised of a means for producing a direct current voltage at 25 degrees centigrade of from about 1.6 to about 1.7 volts. Thus, in the device illustrated in FIG. 1, 2, 3, and 4, 8, and 9, the voltage derived from adjustable resistor 64 serves this function. In the device illustrated in FIGS. 5, 6, and 7, this function is served by the construction of shunt regulator element 256 which is preferably adjusted by adjusting the total series current using a voltage reference derived from resistor 64 (see FIGS. 6 and 7).

The direct current voltage produced by such means is the voltage at 25 degrees Centigrade. In several embodiments of applicant's invention (i.e., every embodiment except that of FIG. 3), applicant's device is also comprised of a means for producing a direct current voltage of from about 1.6 to about 1.7 volts at 25 degrees Centigrade, which will decrease at a rate of from about 1 to about 4 millivolts per degree Centigrade as the temperature increases above 25 degrees Centigrade, and which will increase at a rate of from about 1 to about 4 millivolts per degree Centigrade as the temperature decreases below 25 degrees Centigrade. It is preferred that the rate of increase or decrease be about 1.6 millivolts per degree Centigrade. This feature is provided in the devices of FIGS. 1, 2, 3, 4, 8, and 9 (by the forward voltage temperature coefficient of diodes 58 and 60), and in FIGS. 5, 6, and 7 (by the forward voltage temperature coefficients of diodes 234, 236, and the base emitter voltage of transistor 240).

Applicant's battery charger also is comprised of means for individually limiting the voltage which each cell may be charged to a direct current voltage at 25 degrees Centigrade within the range of from about 1.6 to about 1.7 volts; this maximum voltage, as described above, is preferably negatively temperature compensated so that it will vary from about 1 to about 4 millivolts per degree centigrade as temperature changes from 25 degrees Centigrade. Thus, e.g., this feature is provided as described above; by varying the reference voltage, one varies the maximum cell voltage.

Applicant's battery charger is also comprised of means for individually limiting the current applied to each cell being charged to a current of less than 800 milliamperes, provided that the current also is less than the amount defined by the following formula: $I_{max}=(1.7 \text{ volts}-V_r)/R_i$. $I_{max}$ is the maximum allowed charging current, which always is less than 800 milliamperes, but may be even lower. $V_r$ is the reference voltage, and it is equal to the maximum allowed cell voltage described above; it generally is from about 1.6 to about 1.7 volts at 25 degrees centigrade, which value is preferably negatively temperature compensated as described above. $R_i$ is the internal resistance of the cell being charged. As is known to those skilled in the art, the internal resistance of a cell can be measured by a standard digital voltmeter and is equal to the ratio of the change in cell voltage divided by the current of a step load applied to that cell. For AA size alkaline cells, the test for internal resistance typically involves the connection of a 10 ohm load to an unloaded cell.

In one preferred embodiment, the applicant's charger is comprised of means for limiting the current applied to each cell being charged to a current of less than 300 milliamperes. In another embodiment, the current applied to each cell is limited to a maximum of 200 milliamperes. In yet another embodiment, the current applied to each cell is limited to a maximum of 170 milliamperes.

This feature of applicant's device is illustrated in FIGS. 1, 2, 3, 4, 8, and 9 (by selecting the value of resistor 40), in FIG. 5 (by selecting the value of resistor 254), and in FIGS. 6 and 7 (by selecting the value of resistor 270 and the adjustment of the reference voltage from resistor 64).

Applicant's device also is comprised of means for individually and continually varying the current applied to each cell. As will be apparent to those skilled in the art, the fact that applicant's charger individually and continuously adjusts the current applied to each cell means that, at least during a portion of the charging cycle for any particular cell, the current supplied to any one cell will differ from the current supplied to any other cell. This feature allows the simultaneous recharging of cells with substantially different capacities and/or initial states of charge without depending on any recombinant current absorption capacity by the cell. This feature allows each cell to be charged to its capacity without requiring any current through this or any other cell beyond that required to charge such cell to its capacity.

This means for individually and continuously varying the current applied to each cell is illustrated in FIGS. 1, 2, 3, 4, and 8 (see comparator 34 which controls the charging current to that cell only), in FIGS. 5, 6, and 7 (each shunt regulator 256 limits the voltage to its associated battery 258 only), and in FIG. 9 (comparator 34 limits the voltage available to any and all cells).

Most of the prior art battery chargers of which applicant is aware contain means for providing small charging current to the cells being charged even after such cells have reached their desired voltage, at "high charge cutoff." This "trickle current" has two functions. In the first place, it compensates for "local currents" or self-discharge currents" within the cell and, thus, provides capacity maintenance. In the second place, it slowly completes charging to 100 percent of capacity of each and every cell despite capacity variations between cells, by depending on the recombinant absorption capacity of those cells subject to this current but already at a sufficient state of charge to not significantly absorb the current.

In applicant's device, by comparison, after any particular cell being charged has reached its final permitted voltage, additional current will only be provided as and when required to maintain that voltage. Means are provided for individually and independently reducing the current flow to zero when the cell has reached its desired voltage.

In one embodiment, the desired voltage of the cell being charged is from about 1.625 to about 1.630 volt, at 25 degrees Centigrade.

It will be apparent to those skilled in the art that, for certain specific applications, modifications of the basic designs may be advantageous.

By way of illustration, in one embodiment the rate of capacity restoration relatively early in the charging cycle is enhanced by the application of short, relatively high reverse current pulses. See, e.g., FIGS. 1, 2, and 7.

Furthermore, alternatively, or additionally, one may improve the ability of the cell to recover from excessive discharge or storage in a discharge state, especially on the first recharge cycle. This characteristic can be somewhat improved by the application of rare, wide, relatively low current discharge pulses, as additionally provided in FIGS. 1, 2, and 7.

As is illustrated in FIG. 8, one may trade recharge time for prolonged survival under continuous charging conditions for potential standby applications.

Battery charger with a cell status display

FIG. 10 illustrates a battery charger 360 with a cell status display. Many of the elements of the battery charger 360 of this FIGURE are identical in value and function to the battery chargers depicted in FIGS. 1 and 2; and such common elements are numbered identically to the manner they are numbered in FIGS. 1 and 2. However, additionally, the battery charger of FIG. 10 also contains additional components 201 et seq. which are identified by odd numbers appearing between 201 and 223. These additional components, and their functions, will be described below, it being understood that the functions of the other components of charger 360 are not modified by these new components.

Referring to FIG. 10, it will be seen that resistors 205 and 207 provide a new, additional reference voltage ("$V_{r2}$") lower than the original reference voltage (now designated $V_{r1}$ and isolated by resistor 203. This reference voltage $V_{r2}$ is applied to the non-inverting input (for each cell) of an additional voltage comparator 209 (which may be identical to the comparator selected as comparator 34), the inverting input of which is connected to the positive terminal of the individual cell being charged (not shown).

Transistor 150 provides the control for transistor 180 for the long pulse (about once a minute discharge) and the inputs to diode 115. Diode 201 is controlled from the same source as transistor 150. In this embodiment, transistor 150 also is employed to illuminate light emitting diode 217 through current control resistor 215. As will be apparent to those skilled in the art, when such light emitting diode 217 is activated, this indicated that the cell has been withdrawn from recharge and is being actively discharged.

Referring again to FIG. 10, resistor 223 provides back bias to transistor 180 to insure turn off when neither transistor 150 or 178 is conducting. The current through elements 215 and 217 provides the input to the base of PNP transistor 219 (the base-emitter junction of which is positively turned off by the resistor 221); transistor 219, e.g., may be a type 2N4403 or a similar device. The collector of transistor 219 provides the input power to the comparators 209 (one per cell). Thus, comparator 209 will operate only during the long pulse interval. During such interval, should the cell under test (under discharge load) reach a voltage below $V_{r2}$, comparator 209 will illuminate light emitting diode 213 through current control resistor 211.

Thus, light emitting diode 213 will inform a user approximately once per minute of the capacity of the cell under test to sustain a load voltage above $V_{r2}$. Therefore, by the selection of the value of $V_{r2}$ for a given test current and duration, the quality of the cell under test at any stage of the charging process may be displayed. By selecting $V_{r2}$ appropriately (1.530 volts provides a cosmetically appealing display), the performance of the cell required to pass the test within a short time after the initiation of recharge (often within about 15–60 minutes) may be displayed. This device thus provides the user with the ability to determine early in the cell recharge cycle whether the cell under recharge will in fact adequately recharge and enables such to avoid prolonged, unsuccessful commitment of charger capacity early in the charging cycle; and the display clearly indicates, when appropriate, that unsuccessful charging may be caused by the cell rather than the charger.

While the invention as described before and shown in FIGS. 1–10 is effective for recharging primary zinc-manganese dioxide alkaline batteries, as well as rechargeable alkaline manganese cells, nickel cadmium cells, and conventional standard and heavy duty "dry cells" to the extent that they are rechargeable, an improvement in the overall quality of the recharged cell, i.e. capacity and available power output considered together, can be provided by selecting a charge cut-off voltage which represents a value sufficiently above the cell open circuit voltage (over voltage) to insure adequate charge acceptance, but sufficiently low to avoid as much irreversible chemistry as possible (such as the well known permanganate threshold).

The selected value for the charge cut-off voltage which represents a value sufficiently above the cell open circuit voltage to insure adequate charge acceptance while being sufficiently low to avoid as much irreversible chemistry as possible, is in the range of about 1.600 to about 1.610 volts at a reference temperature of 25° C. and preferably about 1.605 volts (at a reference temperature of 25° C.). Of course, or device specific applications, a slightly different voltage may be preferable. While the values for the charge cut-off voltage, as set forth below, are referenced to 25° C., they can be appropriately corrected for other temperatures, as is known to one skilled in the art.

Figure 11A:
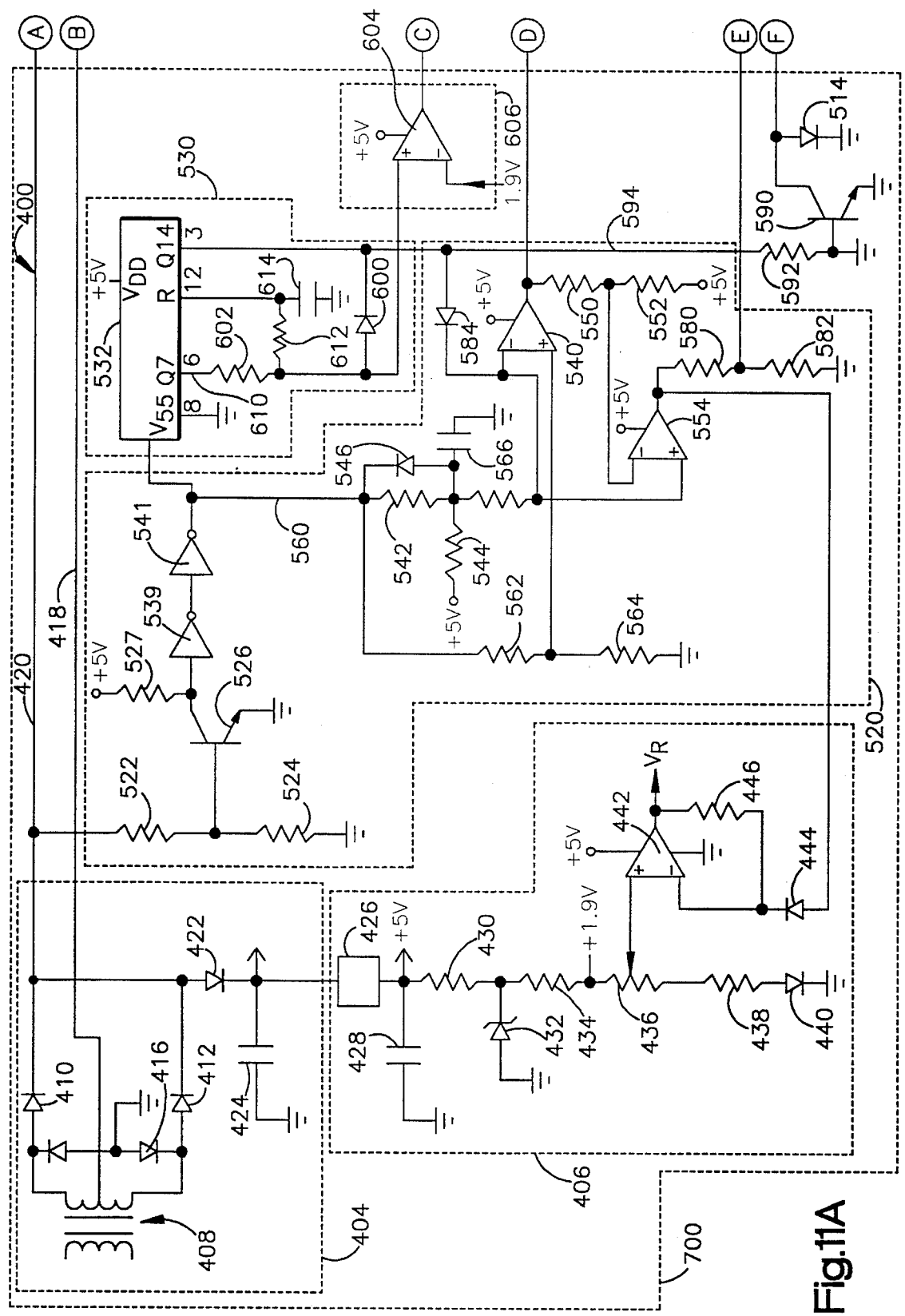
FIG. 11 is a schematic of a battery charger which terminates all charge and discharges to limit the total current delivered to the cell in accordance with the present invention.
Figure 11B:
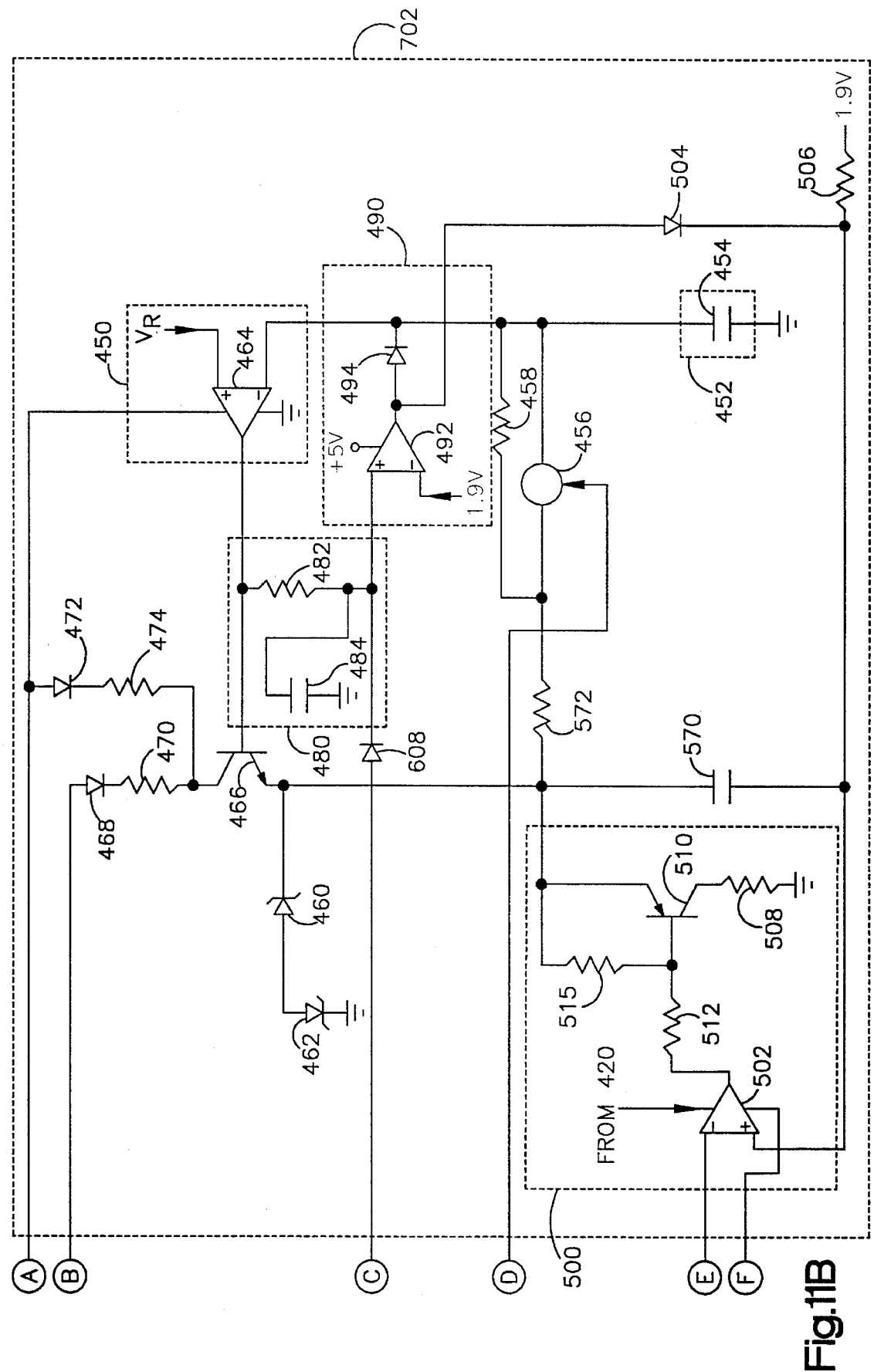

The battery charger 400, as illustrated in FIG. 11, includes the general design characteristics of previous designs, as illustrated in FIGS. 1–10, including the combination of limited charge current, temperature compensation (negative T.C. cut-off voltage) and a dual (long and short) reverse pulse charge/discharge pattern.

The preferred embodiment of the present invention, as shown in FIG. 11, exploits the charge pattern which includes the long pulse (approximately 1 minute) timing cycle to control the end-of-charge behavior. The example discussed below restarts charge at the end of the long pulse duration, which has been reselected at approximately one half second (the minimum duration comparable to the step function equilibrium time at low states-of-charge) to minimize total net A.C. current. The charge restart is independent of the previous state of the system.

The charge pattern once started consists of a forward current pulse of approximately 6 milliseconds and a reverse pulse of approximately 500 micro-seconds (the minimum duration comparable to the step function response time of a cell in a high state-of-charge) to minimize the A.C. component employed to increase charge acceptance near cut-off.

Once charge commences, the cell voltage is sampled and stored at the end of each charge current pulse period and then compared to the reference to determine whether the next charging pulse will be delivered. The output from the comparator which compares the sample and reference voltages is itself filtered and compared to a second reference voltage. As the cell voltage approaches the reference voltage, the average value of the output of the first comparator, which controls the charging current, decreases. When this average value declines to below the second reference voltage, a second comparator operates to 1) stop charging (lock-out), 2) stop the short discharge pulses, and 3) stop the long discharge pulse.

There will be no current drawn from the cell (short or long discharge pulse) from the time lock-out occurs until the charger is restarted following the interval during which the long discharge pulse would have occurred. Therefore, there is no excess "make-up" current required, the subsequent charge interval is minimized, and the total bi-direction current flow, which can contribute to cell evolution, is similarly minimized.

Referring now to FIG. 11, a description of the circuit of a battery charger system 400 utilizing the lock-out and shut-down control in accordance with a preferred embodiment of the present invention follows. Battery charger system 400 includes a main power supply section 404 which is the source of power for battery charger 400 and for the regulated power source and reference voltage section 406. The supply section 404 includes a main transformer 408 which provides line isolation and voltage step down to a level appropriate for battery application, typically 9 VAC (center tapped). Rectifier diodes 410, 412, 414, and 416 provide the D.C. primary and secondary voltages for busses 418 and 420. The primary D.C. output on bus 418 is from the transformer center tap and provides an efficient source of cell charging current. The secondary output at bus 420 (from diodes 410 and 412) is at approximately double the voltage of the primary output, i.e. about 10 VDC, and is used to power the LED's, the charger control comparator, an additional set of comparators, and the regulator which powers the remainder of the electronics and the reference voltage section. The secondary output at bus 420 is connected to the regulated power source and reference voltage section 406 through a diode 422 which isolates filter capacitor 424 from secondary output 420 so that supply section 404 provides a continuous D.C. input to section 406.

The regulated power source and reference voltage section 406 includes a regulator 426, such as for example a 78L05, which provides a regulated D.C. output with a virtually zero temperature coefficient that is suitable for powering the majority of the electronics in battery charging system 400. This stable voltage source (with additional filtering from capacitor 428) also provides the input to a two stage voltage reference network. Resistor 430 provides current to Zener diode 432, such as for example an 1N5228B, is selected to have a temperature coefficient of approximately −2mV/° C. Resistor 434, potentiometer 436, and resistor 438 form a voltage divider which provides approximately 1.9 volts at the junction of resistors 434 and 436, and an adjustable voltage (VR) at the arm of potentiometer 436. Diode 440, such as for example an IN4001, provides a small voltage drop and a negative temperature voltage coefficient of approximately −2mV/° C. Therefore, the entire voltage divider has a fairly constant temperature coefficient (T.C.). For a voltage reference in the range of 1.605 V.D.C., this represents approximately −0.12%/° C., which is a suitable value for $ZnMnO_2$ cells.

The regulated power source and reference voltage section 406 also includes an operational amplifier 442, such as for example a LM324A, which buffers the reference voltage so that 1) Vr can be dropped to near zero V.D.C. by applying a positive control signal through diode 444 and 2) feedback resistor 446 configures amplifier 442 as a voltage follower. Since the reference voltage adjustment is actually made by measuring the resultant battery charger cut-off voltage (far down stream of amplifier 442) any errors in amplifier 442 have no effect on the reference voltage adjustment, except for the temperature coefficient at the input offset voltage, which are negligible for a typical operational amplifier 442, such as 7 microvolts/° C. for a type LM324A. An important feature of the section 406 is that the output $V_R$ of operational amplifier 442 is at sufficiently low impedance to be unaffected by the input current to the charger feedback control comparator section 450 which prevents input current interactions and current induced voltage offsets.

The charger feedback control comparator section 450 compares VR to the stored value of the battery voltage in battery voltage sample storage section 452. Sample storage section 452 includes a capacitor 454. The battery voltage is sampled every 8.33 milliseconds (½ cycle at 60 hz), following the end of the charger conduction interval, through sample gate 456 (a transmission gate of a CMOS 4066, for example). The gate 456 is typically protected by a safety resistor 572 (which limits current into the input protective network of gate 456 in case of electrostatic discharge at B+ (clamped by Zener diodes 460 and 462). Resistor 458 provides a small component of the charge to capacitor 454 in sample storage section 452 which is proportional to the average value of the cell over the entire charge cycle. Therefore, if the cell internal impedance rises, the voltage at sample section 452 will be increased and charge cut-off voltage will be reached at a lower state of charge than would be the case for a cell maintaining a lower internal impedance. Thus, battery charge system 400 automatically biases the end-of-charge toward the maintenance of lower cell internal impedance at the cost of a reduction in total state-of-charge, i.e. available capacity.

As the voltage on capacitor 454 in sample section 452 rises toward VR, the output of comparator 464 in control comparator section 450 falls below approximately 2.2 volts which is the cell voltage (1.605 for example) plus VBE of current control transistor 466, which draws its primary charging current from primary output 418 through isolation diode 468 and current limiting resistor 470, plus a smaller contribution from secondary output 420 through charge indicator light emitting diode 472 and its current limiting resistor 474.

The output of comparator 464 in comparator section 450 is averaged by the filter section 480, which includes an R.C. circuit including a resistor 482 and a capacitor 484, for the main charger. The R.C. circuit generates an R.C. time constant with resistor 482 and capacitor 484 that is directed into full charge detector section 490 which acts to lock-out the charger system 400. Section 490 includes a comparator 492 (which may be another op. amp., such as a LM324A) which compares the R.C. time constant to 1.9 v (in this example of a preferred embodiment) derived from the divider junction 434, 436.

As the cell 570 being charged approaches cut-off voltage (as measured at sample storage section 452), the average voltage at the inverting input of comparator 492 decreases toward 1.9 V. When the voltage at capacitor 484 declines below 1.9 V, the output of comparator 492 goes high and, through diode 494, raises the voltage on capacitor 454 in section 452 well past VR causing the entire loop including capacitor 454 in sample storage section 452, comparator 464 in control section 450, and resistor 482 and capacitor 484 in filter section 480 to "lock up".

The output of comparator 492 is directed into pulse discharge section 500 to control the input of open collector comparator (such as an LM339A, for example) 502 through diode 504 to force the noninverting input high (from the 1.9 V provided by resistor 506) and therefore preventing the output of comparator 502 from going low and discharging the cell (on charge) through resistor 508 by turning on transistor 510 through resistor 512. Resistor 515 is a leakage control resistor to reduce discharge through transistor 510 if cells are left in an unpowered charger.

Since the primary discharge current determinate is resistor 508, the discharge current rises with cell voltage (when called for by resistor 508, if permitted by diode 504). The effect at 514 on this behavior will be considered later herein.

Turning now to short pulse timing and sequence generation, resistors 522, 524 form a voltage divider from primary 420 to the base of transistor 526. The base-emitter junction voltage acts as a simple threshold detector to turn off transistor 526 120 times per second (at the 60 Hz AC line zero crossing) and generate a positive pulse of approximately 0.5 msec at collector resistor 527.

The preferred embodiment includes a long pulse timing generator 530 which includes means such as a 4060 14 bit CMOS counter chip 532 for generating a timing sequence. It is within the terms of the invention to use any conventional alternative means of generating a timed long pulse. An almost endless number of alternatives will occur to one skilled in the art.

The input section at the chip 532 contains two sequential inverters. The noninverting input of comparator 540 (an op-amp such as an LM324A) is essentially at zero volts when the output of the second inverter 541 is low. The inverting input is positive with respect to the noninverting input due to the voltage divider resistor 542, 584 (assuming diode 545 is back biased). The output of comparator 540 is low; therefore, the control input of transmission gate 456 is low and capacitor 454 is isolated except for the contribution of resistor 458.

Voltage divider 550, 552 provides a higher voltage input to the inverting input of comparator 554 (another LM324A op-amp, for example) than divider 542, 544. Therefore, the output of comparator 554 is low and the inverting input of the open collector comparator 502 (such as an LM339A, for example) is lower than the noninverting input from 506. Therefore, the output of comparator 502 is off and the cell under charge is not discharged.

When 560 goes high the 562, 564 junction becomes (promptly) more positive than the input from 542, 544 which can not respond immediately due to capacitor 566. Therefore, the output of 540 goes high temporarily, turning on sample gate 456, and connecting capacitor 454 to the cell 570 on charge, through safety resistor 572.

As capacitor 566 charges the voltage at the inverting input of comparator 540, the voltage increases until it exceeds the voltage from 562, 564. Until this happens divider 550, 552 will hold the inverting input of comparator 554 more positive than the noninventing input (despite the rising value, since the output of comparator 540 is high). When the output of comparator 540 switches from high to low, gate 456 closes, again isolating capacitor 454 and divider 550, 552 now reduces the voltage at the inverting input to comparator 554 to below the noninverting input voltage (which is now above the 562, 564 divider voltage.)

Note all of this description assumes that 1) the total cycle of comparator 540, 554 etc. occurs during the zero crossing period of the A.C. line when charging current would be unavailable and ) that the R(542, 544) C(566) time constant is very short compared to the duration of the pulse at 560 (perhaps 50 microseconds, for example). This is generally shorter than the time constant R(572) C(454). Therefore the "sample-hold" voltage tracks the (zero current) cell voltage only slowly (over many samples). Since the cell changes voltage very slowly (by comparison to R(572) C(454)) this filtered value is satisfactory, and essentially noise free.

When the output of 554 goes positive, resistor divider 580, 582 produces a voltage at the inverting input at open-collector comparator 502 which is larger than the voltage from 506 (unless over-ridden by comparator 492 through diode 504, as described previously).

Therefore, each zero crossing of the A.C. line produces two non-overlapping pulses which first samples the cell voltage (at zero current) and then discharges the cell through a fixed resistor for a further brief period—if permitted to do so by a detector which senses and stores full-charge cut-off if it occurs.

The counter 532 will count $2^{13}$ pulses until the $Q_{14}$ output (in this example) goes positive. Diode 584 will then force the inverting input of comparator 540 high and the output low, preventing 456 from conducting. The noninverting input to comparator 554 is simultaneously forced high as is the output of comparator 554 and therefore the input of comparator 502, causing a continuous discharge of cell 570, as long as $Q_{14}$ is high, unless comparator 464, comparator 492, etc. was "locked up" before $Q_{14}$ went high (and diode 504 prevents comparator 502 from operating).

Transistor 590 is turned on through resistor 592 from the $Q_{14}$ output (line 594) of chip 532. This effectively bypasses diode 514 which provided a small voltage drop in series with the entire comparator 502. Therefore, the output of comparator 502 can now force one end of resistor 512 essentially to ground (common) and therefore provide substantial (long pulse) discharge currents if lock-up does not inhibit operation, to batteries even at low cell voltage (for re-equilibration), while the short pulses (with diode 514 not bypassed) were only effective at producing significant discharge currents as the cell approached a high state-of-charge, due to the voltage drops of diode 514 and VBE of transistor 510. Therefore, charge acceptance enhancement was only provided toward the end of charge (where needed) and charger capacity was not "wasted" at low states-of-charge.

When an additional period has elapsed (corresponding to $2^6$ counts, approximately ½ second, i.e. $Q_7$ in the example) the $Q_7$ output goes high and since $Q_{14}$ is already high, diode 600 does not clamp the $Q_7$ output (after resistor 602), which allows the noninverting input of comparator 604 (another LM324 op-amp, for example) in unlock generator section 606 to exceed the voltage applied to the inverting input. Therefore, the output of comparator 604 goes high and diode 608 forces capacitor 484 and the inverting input of comparator 492 goes high which forces the output of comparator 492 low. However, the voltage on capacitor 454 remains high, keeping the output of comparator 464 low.

Note that any time the output of comparator 554 goes high and provides a discharge signal to comparator 502, whether or not over-ridden by diode 504, comparator 554 forces the VR output of comparator 442 low by forcing the inverting input high through diode 444.

Once line 610 goes high, resistors 602 and 612 charge capacitor 614 until the reset threshold of chip 532 is reached. Then lines 610 and 594 go low, and slightly later (R(612), C(614)) so does the output of comparator 604, reversing diode 608.

This restarts the entire system. Note at this time 454 capacitor is high (well above VR, which is once again provided) and capacitor 484 is high despite the output of comparator 464 being low. However, the time constant R(572), C(454) (even multiplied by the small duty cycle of 456) is made much shorter than R(482), C(484). Therefore, comparator 464 will go into normal operation before capacitor 484 can fall so far that comparator 492 can lock-up the system.

Therefore, following each "long pulse" discharge interval, whether or not the discharge was permitted to occur, the charger 400 is forced into a charge made for a brief interval while the memory of the "lock out" (if it occurred) dissipates, whereupon the system is free to "lock-out" again if the cell is at virtual cut-off voltage, and wait for the entire cycle to repeat, with no charge or short or long pulse discharge actually occurring. This minimizes the increase in internal impedance which reduces the utility of recharged primary $ZnMnO_2$ alkaline cells, while not significantly affecting the recharging of R.A.M., NiCad or "dry cell" batteries.

The circuitry within section 700 operates independently of the charging progress of cell 570, whereas the operation of the circuitry within section 702 is dependent upon the charging progress of cell 570. Therefore, one section 700 can service numerous sections 702. Hence, a battery charger 400 can be modified to charge multiple cells simultaneously, monitoring and controlling the charging, discharging, and lockout functions of each cell individually and independently. Such a multi-cell charger would be comprised of one section 700 and numerous sections 702, one section 702 for each cell. All the sections would be connected in parallel to section 700. The interface connections of all the sections 702 to the single section 700 in such a multi-cell charger would be the same as the interface connections between section 702 and section 700 in charger 400.

The patents, patent applications, and the articles listed herein are intended to be incorporated by reference in their entireties.

It is apparent that there has been provided in accordance with this invention apparatus and methods for that satisfy the objects, means and advantages set forth hereinbefore. While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

We claim:

1. A battery charger, comprising:

means for charging each of one or more cells with a charge pattern which includes a time period of individual charge alternating with one or more time periods of individual discharge;

means for providing a charge cut-off voltage which represents a value sufficiently above a desired cell open circuit voltage to insure adequate charge acceptance, but sufficiently low to avoid significant cell degradation;

means for comparing the cell voltage of each of said one or more cells being charged to said cut-off voltage at the end of each time period of charge;

means for stopping said charge of said one or more cells individually whenever said voltage of said one or more individual cells being charged exceeds said cut-off voltage;

means for stopping said charge pattern of said one or more cells individually when said one or more individual cells being charged discharges above said cut-off voltage for a longer period of time as compared to the duration of the individual charge period;

means for stopping said charge pattern of said one or more cells individually when said cell voltage of said one or more individual cells being charged averages about said cut-off voltage for a longer period of time as compared to the duration of said time period of individual charge; and means for restarting said charge pattern of said one or more cells after a long pulse time period.

2. The battery charger of claim 1 wherein:

said average value of said cell voltage is taken over a time period substantially longer than the duration of said time period of charge; and said long pulse time period is substantially greater than the duration of said time period of said average value of said cell voltage.

3. The battery charger of claim 1 wherein said cell is selected from the group consisting essentially of zinc-manganese dioxide alkaline cells, zinc-manganese dioxide cells, rechargeable alkaline manganese cells, nickel cadmium cells, and standard and heavy duty dry cells.

4. The battery charger of claim 1 wherein said cut-off voltage is between 1.6 and 1.67 volts.

5. The battery charger of claim 4 wherein said cut-off voltage is 1.605 volts.

6. The battery charger of claim 5 wherein said means for charging applies a charging voltage of between 1.6 to 1.7 volts.

7. The method of charging one or more cells, comprising the steps of:

charging each of said one more cells with a charge pattern which includes a time period of individual charge alternating with one or more time periods of individual discharge;

setting a charge cut-off voltage which represents a value sufficiently high to insure adequate charge acceptance, but sufficiently low to avoid significant cell degradation;

comparing the voltage of each of said one or more cells being charged to said cut-off voltage at the end of each time period of charge;

stopping said charge of said one or more cells individually whenever said voltage of said one or more cells individually being charged exceeds said cut-off voltage;

means for stopping said charge pattern of said one or more cells individually when said cell voltage of said one or more individual cells being charged averages about said cut-off voltage for a longer period of time as compared to the duration of said time period of individual charge; and restarting said charge pattern of said one or more cells after a long pulse time period.

8. The method of claim 7 wherein:

said average value of said cell voltage is taken over a time period substantially longer than the duration of said time period of charge; and said long pulse time period is substantially greater than the duration of said time period of said average value of said cell voltage.

9. The method of claim 8 including the step of selecting said cell from the group consisting essentially of zinc-manganese dioxide alkaline cells, zinc-manganese dioxide cells, rechargeable alkaline manganese cells, nickel cadmium cells, and standard and heavy duty dry cells.

10. The method of claim 7 wherein said cut-off voltage is between 1.6 and 1.67 volts.

11. The method of claim 8 wherein said cut-off voltage is 1.605 volts.

12. The method of claim 11 wherein said step of charging applies a charging voltage of between 1.6 to 1.7 volts.

* * * * *